US007111069B2

(12) United States Patent
Narioka et al.

(10) Patent No.: US 7,111,069 B2
(45) Date of Patent: Sep. 19, 2006

(54) INFORMATION PROCESSING APPARATUS AND METHOD, AND PROGRAM STORAGE MEDIUM

(75) Inventors: Hiroto Narioka, Kanagawa (JP); Hiroyuki Bando, Kanagawa (JP)

(73) Assignee: Sony Corporation, Tokyo (JP)

( * ) Notice: Subject to any disclaimer, the term of this patent is extended or adjusted under 35 U.S.C. 154(b) by 742 days.

(21) Appl. No.: 09/892,952

(22) Filed: Jun. 26, 2001

(65) Prior Publication Data
US 2002/0013657 A1 Jan. 31, 2002

(30) Foreign Application Priority Data
Jun. 27, 2000 (JP) ............................. 2000-193161

(51) Int. Cl.
G06F 15/16 (2006.01)
(52) U.S. Cl. ...................... 709/232; 709/223; 709/246
(58) Field of Classification Search ................ 709/225, 709/229, 238, 244, 232, 223, 246; 455/556.1
See application file for complete search history.

(56) References Cited

U.S. PATENT DOCUMENTS

| 5,948,042 | A | * | 9/1999 | Heimann et al. | ........... | 701/208 |
| 6,006,109 | A | * | 12/1999 | Shin | ........................ | 455/557 |
| 6,098,048 | A | * | 8/2000 | Dashefsky et al. | ............ | 705/10 |
| 6,240,360 | B1 | * | 5/2001 | Phelan | ....................... | 701/208 |
| 6,266,614 | B1 | * | 7/2001 | Alumbaugh | ................ | 701/211 |
| 6,650,647 | B1 | * | 11/2003 | Ishikawa et al. | ............ | 370/400 |
| 6,662,013 | B1 | * | 12/2003 | Takiguchi et al. | ....... | 455/456.2 |
| 6,742,022 | B1 | * | 5/2004 | King et al. | ................. | 709/219 |
| 6,760,770 | B1 | * | 7/2004 | Kageyama | .................. | 709/229 |

FOREIGN PATENT DOCUMENTS

| EP | 0 959 418 | 11/1999 |
| WO | WO 97 07467 | 2/1997 |

OTHER PUBLICATIONS

Hunter T et al: "Land navigation and fleet management with GPS, Loran, and dead reckoning sensors" IEEE XP010078744.
Wichtel E et al: "AVL subsystem interfaces" Vehicular Technology Conference, 1994 IEEE 44th Stockholm, Sweden Jun. 8-10, 1994, New York, NY, USA, IEEE, Jun. 8, 1994, pp. 405-409, XP010123085 ISBN: 0-7803-1927-3.

* cited by examiner

*Primary Examiner*—Zarni Maung
*Assistant Examiner*—Nghi Tran
(74) *Attorney, Agent, or Firm*—Oblon, Spivak, McClelland, Maier & Neustadt, P.C.

(57) ABSTRACT

A position information generating unit of a personal computer generates position information using GPS and/or PHS, and outputs the generated information to a supplementary information generating unit. The generating unit supplements the position information from the position information generating unit with additional information such as map data, and outputs the supplemented information to an HTML generating unit. The HTML generating unit generates an HTML file out of the supplemented position information from the supplementary information generating unit, and transmits the generated file to a content server. A position information transmission-reception control unit of the content server stores the HTML-format position information thus sent from the personal computer into a storage unit. An HTML acquiring unit of the personal computer acquires position information in HTML format about another member from the storage of the position information transmission-reception control unit, and causes the obtained information to appear on a display unit.

4 Claims, 19 Drawing Sheets

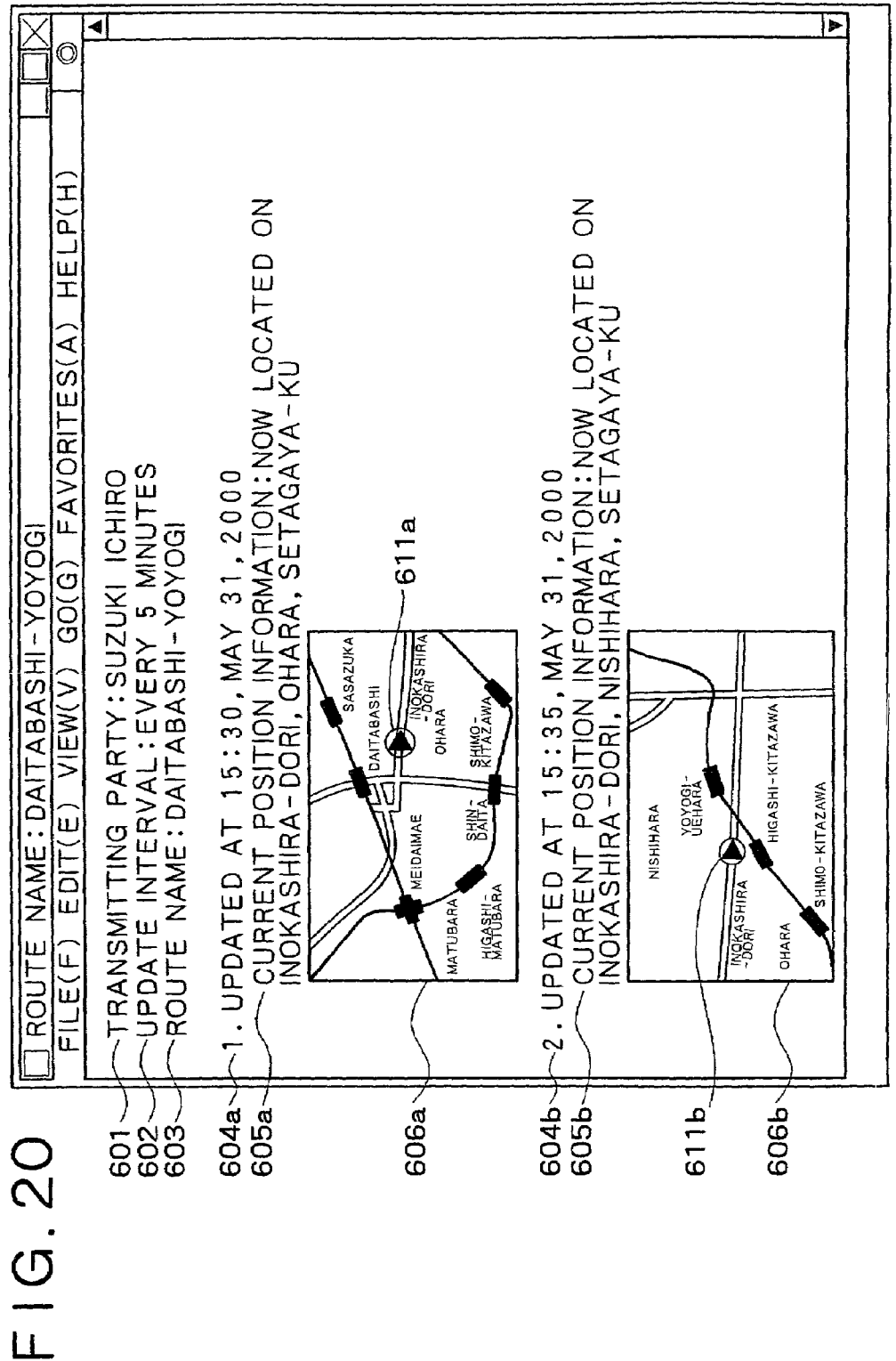

INFORMATION PROCESSING APPARATUS AND METHOD, AND PROGRAM STORAGE MEDIUM

BACKGROUND OF THE INVENTION

The present invention relates to an information processing apparatus, an information processing method and a program storage medium. More particularly, the invention relates to an apparatus and a method for processing information as well as to a storage medium for storing a program implementing the method for use with the apparatus whereby position information is converted to a highly versatile format before being transmitted to a server to be disclosed to and shared by a plurality of portable terminals.

Recent years have witnessed widespread acceptance of systems that allow a plurality of users to share their position information by means of their portable terminals.

There are conventionally two major types of position information sharing system. One is typically made up of users' portable terminals that detect their positions individually by use of a GPS (Global Positioning System) or a PHS (Personal Handyphone System) arrangement and transmit to a dedicated server the detected information reflecting the positions of the terminals. In turn, the server creates dedicated files that bring together the position information sent from the individual portable terminals. Operating their portable terminals, users gain access to the server and share position information acquired from its dedicated files. A position monitoring system that has been offered by Fuji Xerox Co. Ltd., to business people traveling on business is a typical service that employs such a dedicated server.

The other known type of position information sharing system is one which generates files containing position information by utilizing PC software having recourse to map data in such a manner that the files may be exchanged directly between users' portable terminals sharing position information or in a way that one portable terminal may send its position information to another specific terminal for position information sharing purposes. Sony, the present applicant's "Navin' You (trademark)" is a typical PC software product allowing users to share position information among them. The software features a function allowing users to share their position information, and the function is called the party function.

Of the two typical position information sharing systems outlined above, however, the former requires position information to be managed by the dedicated server. That means each user has to enter into a contract authorizing use of the dedicated server. Furthermore, because the position information is managed in a proprietary file format by the server, the information is not versatile enough to be utilized extensively by diverse kinds of portable terminals.

The latter system outlined above has the advantage of allowing users to share their position information directly among them, i.e., without the intervention of a server. In practice, however, much of functional availability of the system is dependent on the type of communication terminal equipment in use. That entails complicated system designs and low performance stability. In addition, each of the users' portable terminals participating in the party function has to be furnished beforehand with dedicated PC software such as "Navin' You" in order to share position information.

SUMMARY OF THE INVENTION

The present invention has been made in view of the above circumstances and provides an apparatus and a method whereby information on positions of users' portable terminals is managed in a file format compatible with highly versatile software offerings so that the position information may be referenced and shared by a plurality of users employing diverse kinds of portable terminals.

According to the first aspect of the present invention, there is provided an information processing apparatus for transmitting position information to other information processing apparatuses over a network, including position information acquiring means for acquiring the position information, position information converting means for converting the position information acquired by the position information acquiring means into a format processable by the other information processing apparatuses, and transmitting means for transmitting to the other information processing apparatuses the position information converted by the position information converting means into the format processable by the other information processing apparatuses.

The position information converting means may convert the position information into the format processable by the other information processing apparatuses by supplementing the position information acquired by the position information acquiring means with peripheral information about surroundings of a position corresponding to the position information.

The position information converting means may convert the position information supplemented with the peripheral information into an HTML format processable by the other information processing apparatuses.

The transmitting means may transmit the position information to the other information processing apparatuses either by electronic mail or by FTP, the position information having been converted by the position information converting means into the format processable by the other information processing apparatuses.

According to the second aspect of the present invention, there is provided an information processing method for use with an information processing apparatus for transmitting position information to other information processing apparatuses over a network, comprising the steps of acquiring the position information, converting the position information acquired in the position information acquiring step into a format processable by the other information processing apparatuses, and transmitting to the other information processing apparatuses the position information converted in the position information converting step into the format processable by the other information processing apparatuses.

According to the third aspect of the present invention, there is provided a program storage medium which stores a computer-readable program for controlling an information processing apparatus transmitting position information to other information processing apparatuses over a network, the computer-readable program comprising the steps of controlling acquisition of the position information, controlling conversion of the position information acquired in the position information acquisition controlling step into a format processable by other information processing apparatuses, and controlling transmission to the other information processing apparatuses of the position information converted in the position information conversion controlling step into the format processable by the other information processing apparatuses.

Through the use of the information processing apparatus, information processing method and program storage medium according to the invention, position information is first acquired. The acquired position information is converted into a format that is processible by other information processing apparatuses. The information thus converted into the format processible by the other information processing apparatuses is then transmitted to those other apparatuses. This makes it possible for a plurality of users' information processing apparatuses of diverse types to share position information therebetween.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 20 is a typical display screen that appears when the personal computer in FIG. 1 acquires position information.

DETAILED DESCRIPTION OF THE PREFERRED EMBODIMENT

Figure 1:
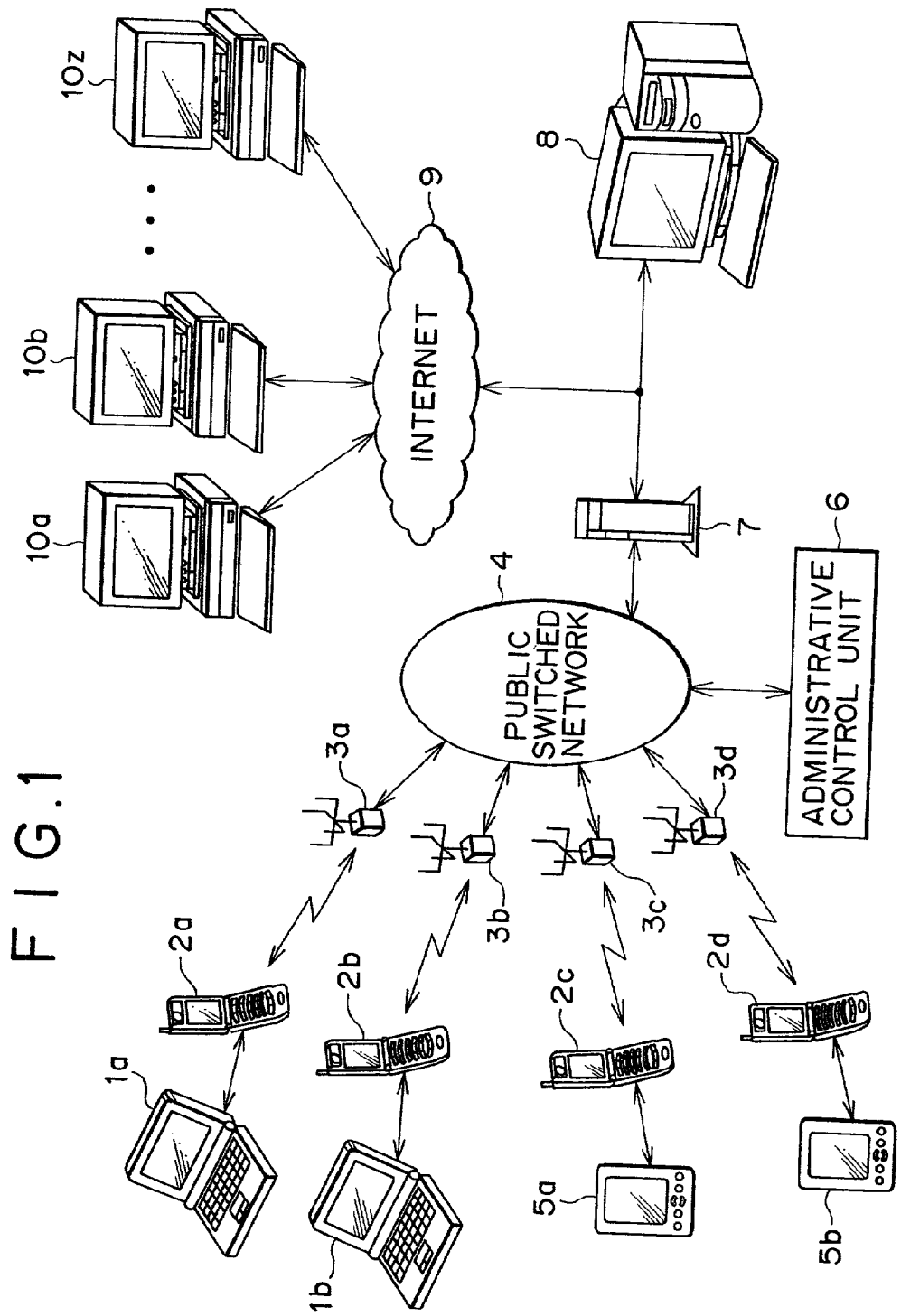
FIG. 1 is a schematic view of a position information sharing system as one preferred embodiment of the present invention.

FIG. 1 is a schematic view of a position information sharing system as one preferred embodiment of the present invention.

Personal computers 1a and 1b (generically called the personal computer 1 hereunder where individual PCs need not be distinguished; the same will apply to other components) acquire position information representative of their own positions by use of an attached GPS (Global Positioning System) 51 (see FIG. 2) that captures signals from satellites, not shown. The position information thus acquired is converted to HTML (Hyper Text Markup Language) files. After conversion, the files are transmitted to a content server 8 through camera-equipped digital portable telephones 2a and 2b, base stations 3a and 3b, a public switched network 4, and an access server 7. The personal computers 1a and 1b may also acquire from the content server 8 HTML files containing position information about other PCs. These files are obtained through the access server 7, public switched network 4, base stations 3a and 3b, and camera-equipped digital portable telephone 2. The file contents are displayed on an LCD 41 (see FIG. 2). Details of the personal computers 1a and 1b will be discussed later.

The camera-equipped digital portable telephones 2a through 2d are mobile wireless stations connected wirelessly to the base stations 3a through 3d illustratively on a code division multiple access principle called a W-CDMA (Wideband-Code Division Multiple Access). Using a frequency band of 2 GHz, the portable telephones are capable of transmitting large quantities of data at data transfer rates of up to 2 Mbps. Because of their ability to communicate massive data at high speed on the W-CDMA principle, the camera-equipped digital portable telephones 2a through 2d may not only make voice calls but also send and receive electronic mails, browse websites in simple format, exchange images, and communicate other diverse kinds of data.

The camera-equipped digital portable telephones 2a through 2d forward position information from the personal computers 1a and 1b as well as from PDAs (personal digital assistants) 5a and 5b to the base stations 3a through 3d. The camera-equipped digital portable telephones 2a through 2d also output signals from the base stations 3a through 3d to the personal computers 1a and 1b as well as to the PDAs 5a and 5b.

The base stations 3a through 3d are established as stationary wireless stations each covering one of cells that suitably divide up a communication service area. The base stations 3a through 3d are also wired to the public switched network 4. The public switched network 4 is connected to the Internet 9 as well as to numerous wired subscriber terminals, computer networks, and local area networks, not shown.

The public switched network 4 is also connected to access servers 7 of Internet service providers. The access server 7 of each Internal service provider is connected to the ISP's content server 8.

It is to be noted that the camera-equipped digital portable telephones 2a through 2d communicate with the base stations 3a through 3d in accordance with a 2-Mbps simple transport protocol. The base stations 3a through 3d communicate with WWW (World Wide Web) servers 10a through 10z based on TCP/IP (Transmission Control Protocol/Internet Protocol) over the Internet 9.

Figure 13:
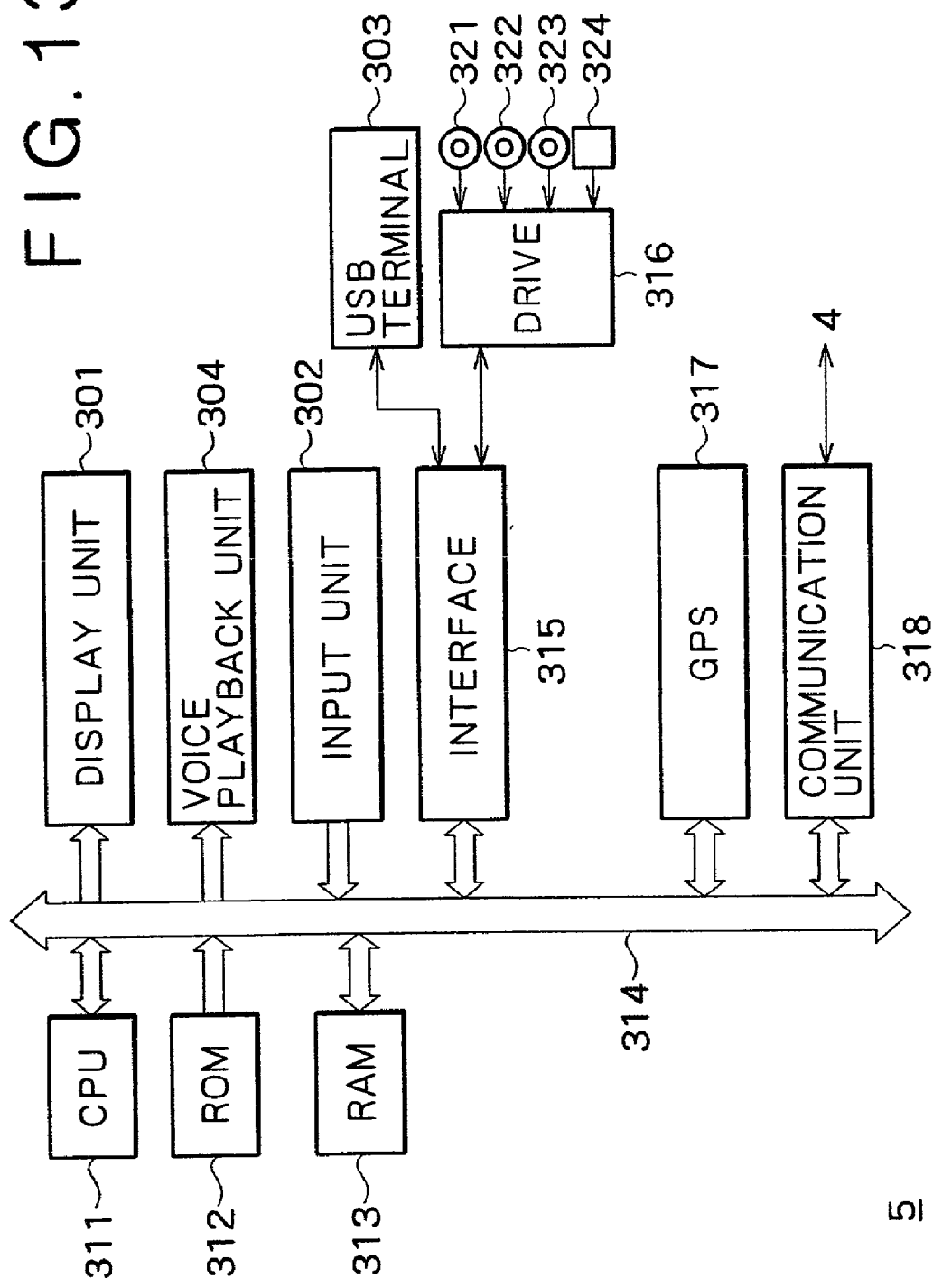
FIG. 13 is a block diagram of the PDA in FIG. 1.

The PDAs 5a and 5b are portable terminals each incorporating a GPS 317 (see FIG. 13) that acquires position information. The acquired position information is sent to the content server 8 through the camera-equipped portable telephones 2c and 2d, base stations 3c and 3d, public switched network 4, and access server 7. The PDAs 5a and 5b also obtain position information files from the content server 8 through the access server 7, public switched network 4, base stations 3c and 3d, and camera-equipped digital portable terminals 2c and 2d. The position information in the files thus acquired is displayed on a display unit 301 (FIG. 13). Details of the PDAs 5a and 5b will be discussed later.

An administrative control unit 6 is connected to wired subscriber terminals and to the camera-equipped digital portable terminals 2a through 2d via the public switched network 4. Thus connected, the administrative control unit 6 performs authentication and accounting processes regarding the wired subscriber terminals and the portable terminals 2a through 2d.

The content server 8 provides contents of, for example, websites as HTML files to the personal computers 1a and 1b as well as to the PDAs 5a and 5b upon request through wired subscriber terminals or camera-equipped digital portable telephones 2a through 2d. In response to an individual request from any of the portable telephones 2a through 2d, the content server 8 may offer contents such as those of simple format websites to the requesting telephone in the form of a compact HTML format file.

The Internet 9 is connected to a plurality of WWW servers 10a through 10z. These servers may be accessed over the Internet 9 by any of the wired subscriber terminals or the camera-equipped digital portable telephones 2a through 2d in accordance with TCP/IP protocol.

Figure 2:
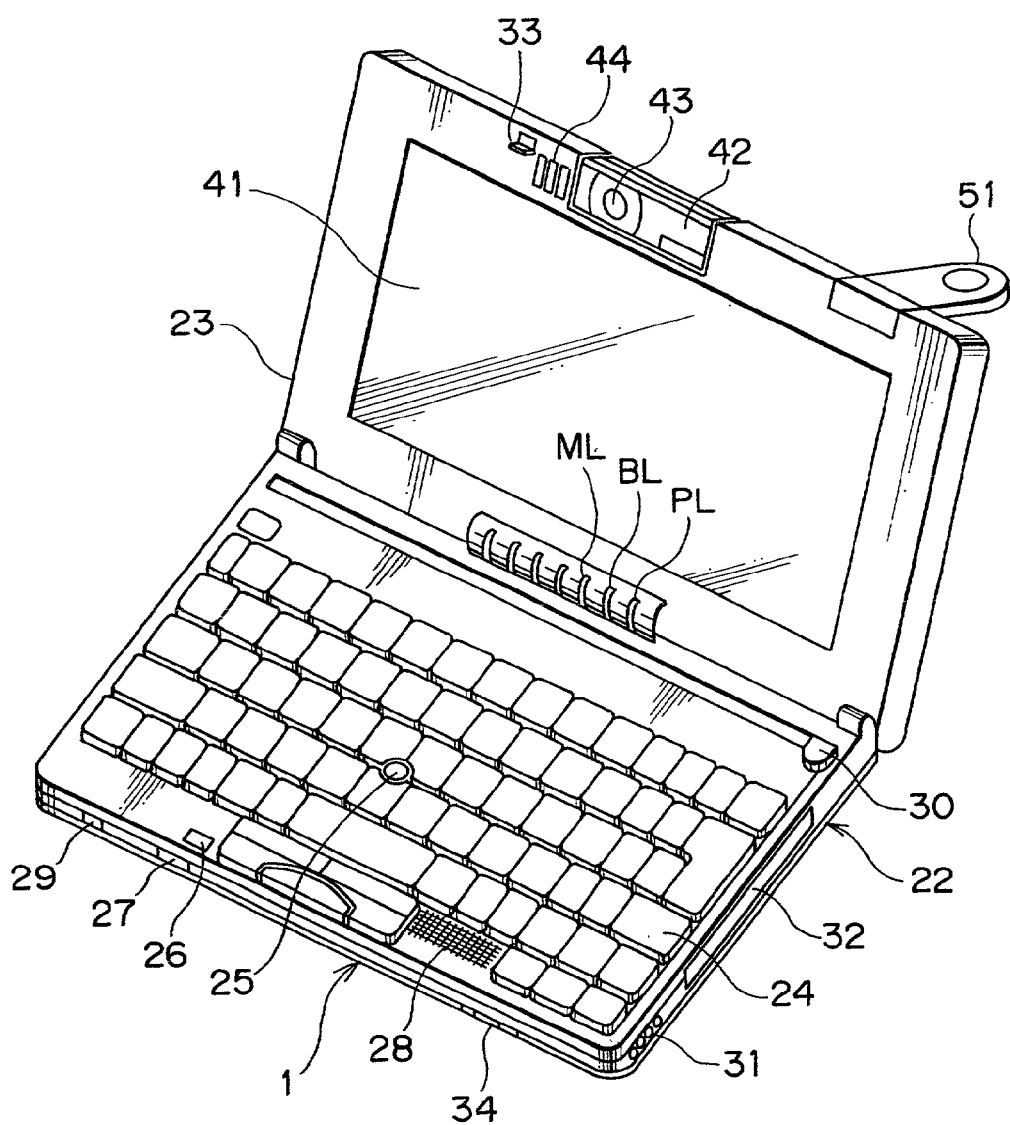
FIG. 2 is an external perspective view of a personal computer shown in FIG. 1.
Figure 3:
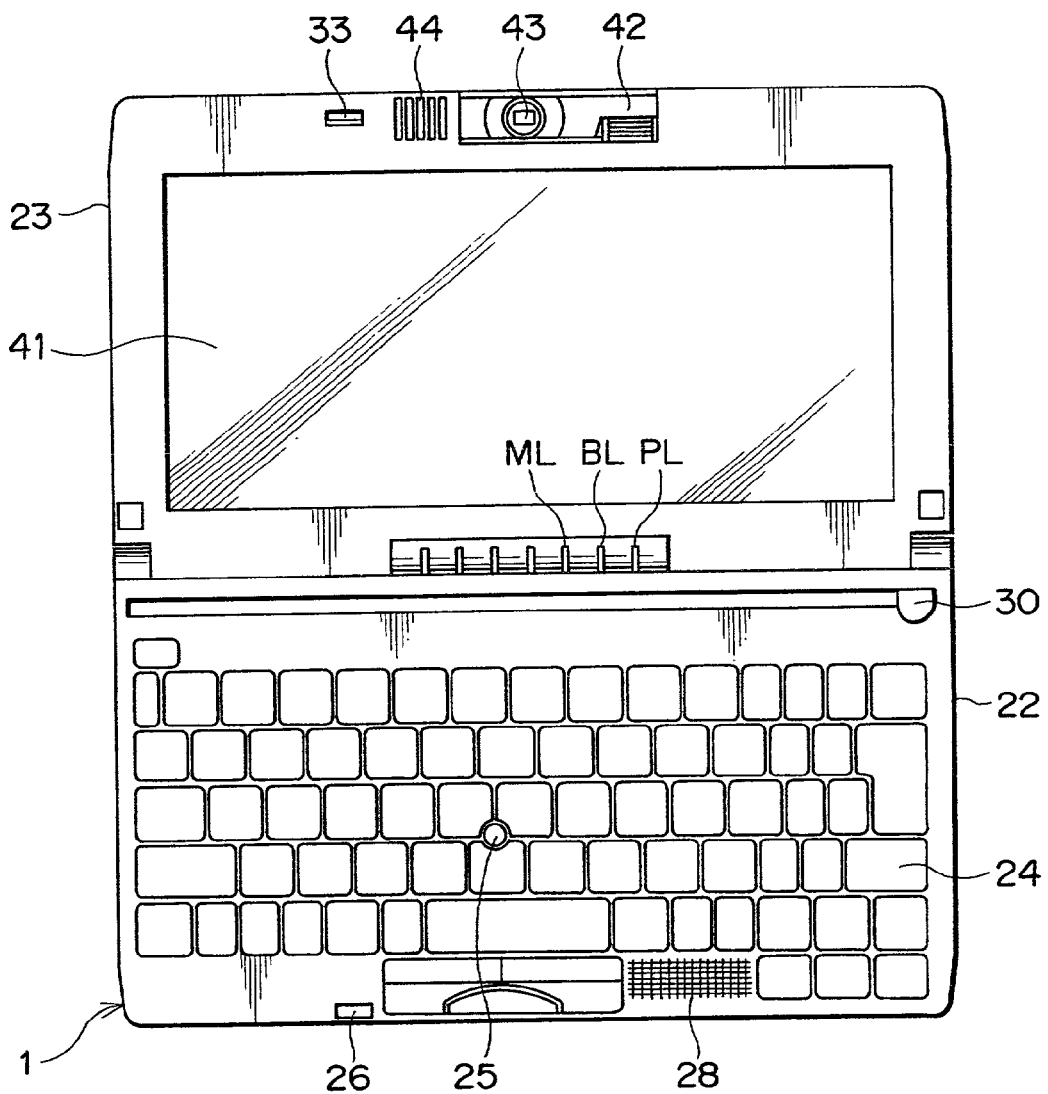
FIG. 3 is a plan view of the personal computer in FIG. 1.
Figure 4:
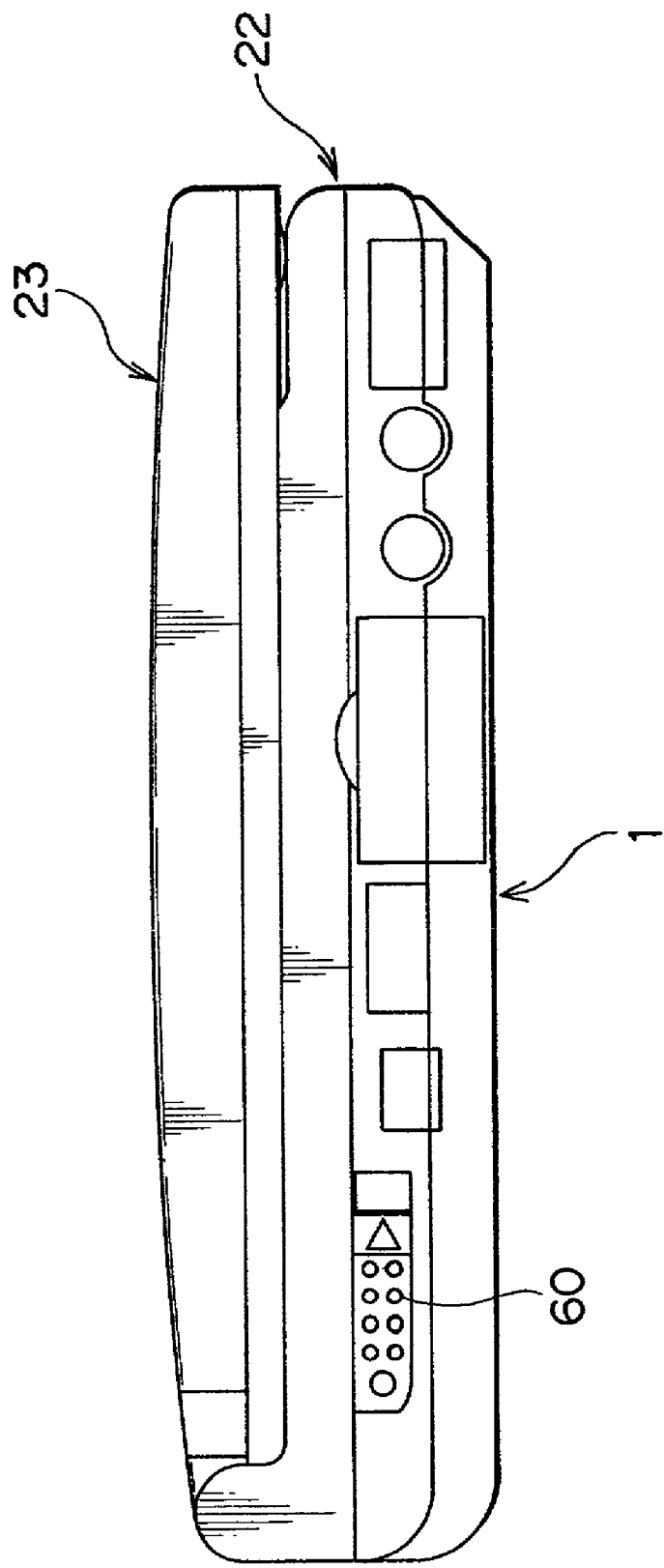
FIG. 4 is a left-hand side view of the personal computer in FIG. 1.
Figure 5:
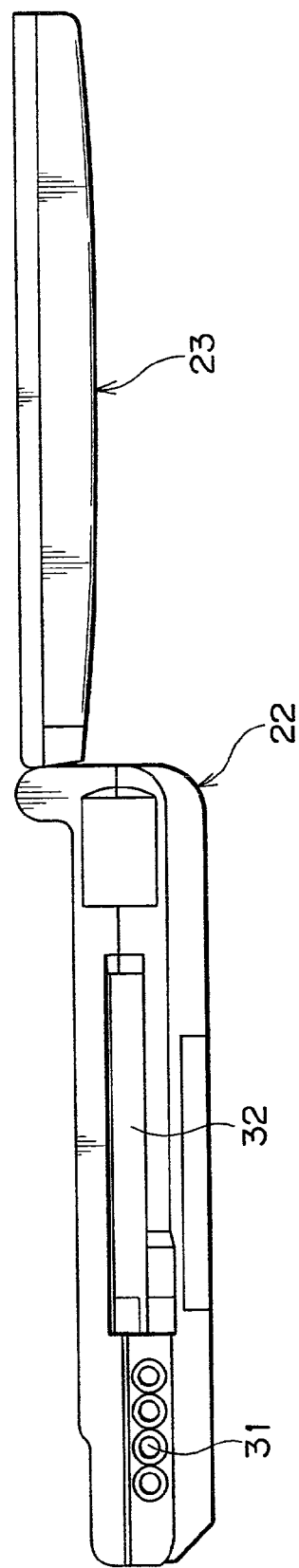
FIG. 5 is a right-hand side view of the personal computer in FIG. 1.
Figure 6:
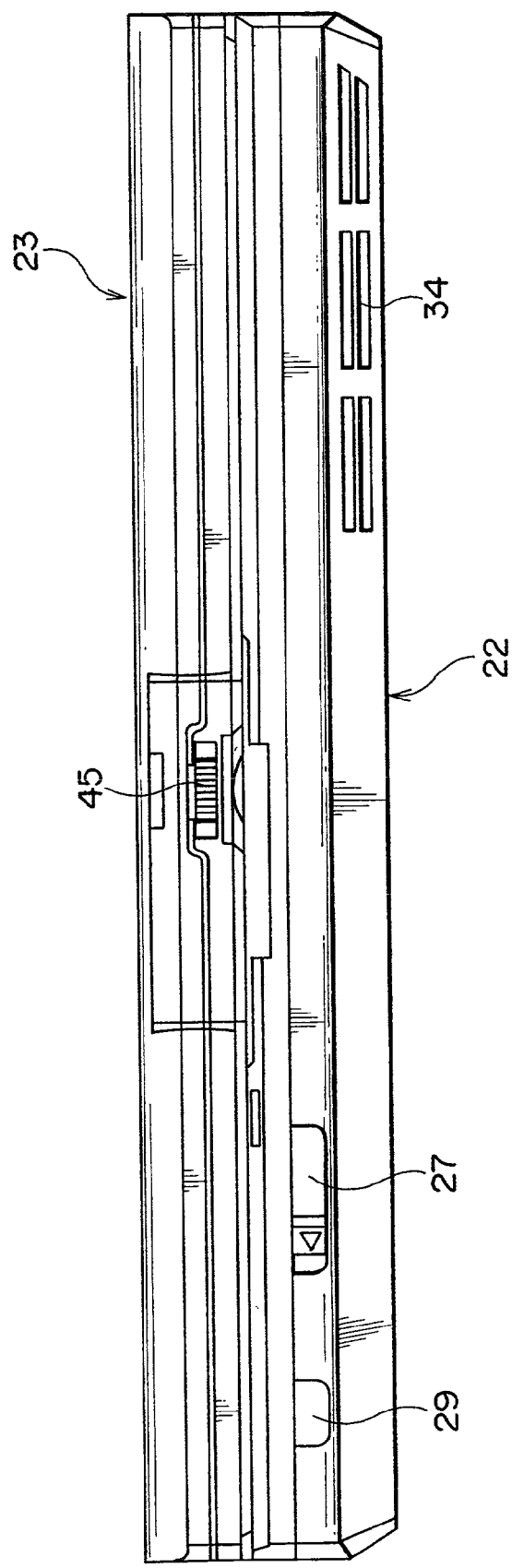
FIG. 6 is a front view of the personal computer in FIG. 1.
Figure 7:
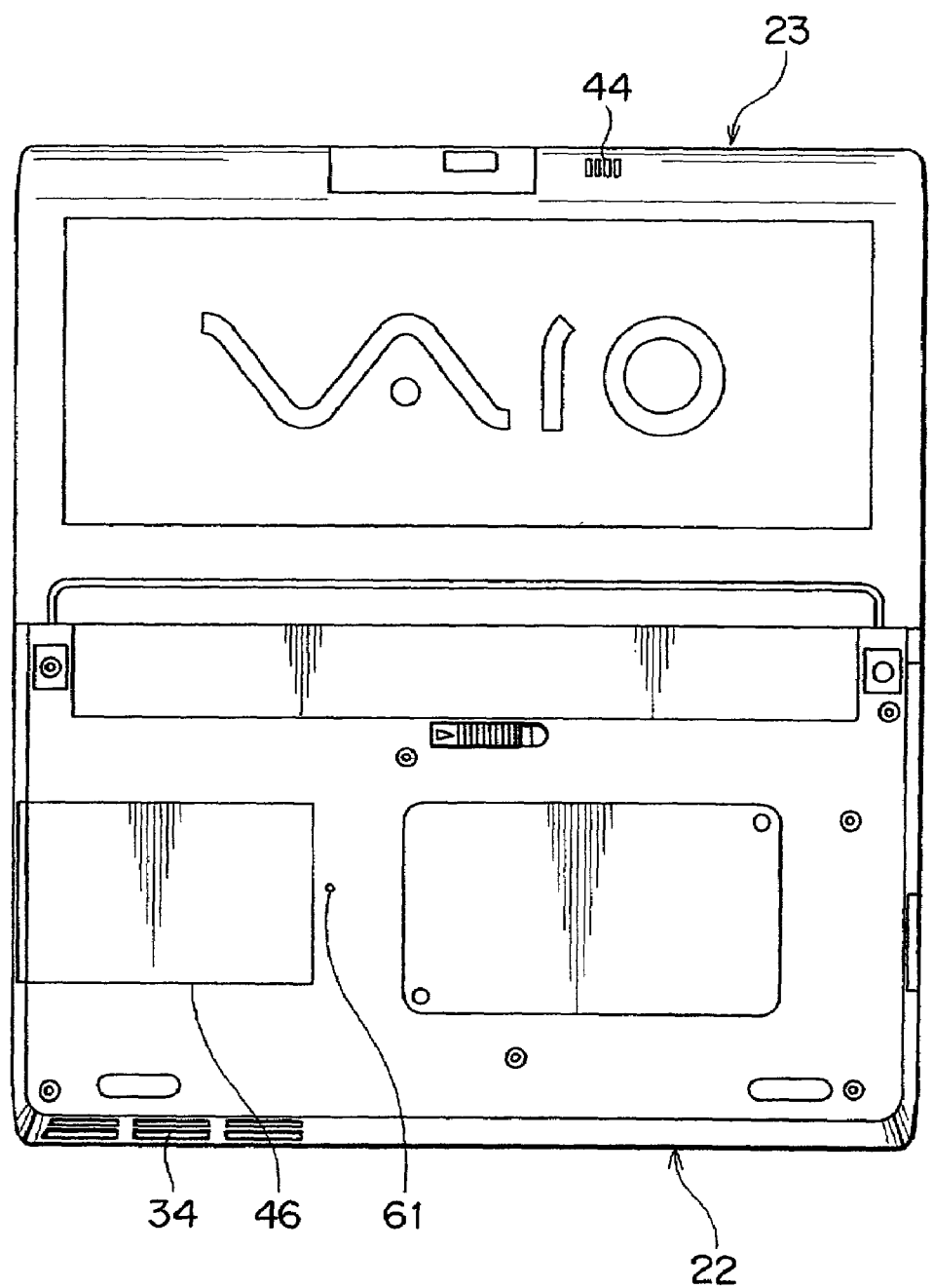
FIG. 7 is a bottom view of the personal computer in FIG. 1.

FIGS. 2 through 7 illustrate typical structures of a portable personal computer. This personal computer 1 is a sub-notebook type PC constituted primarily by a body 22 and a display unit 23 attached swingingly to the body 22. FIG. 2 is an external perspective view of the personal computer 1 with the display unit 23 swung open away from the body 22; FIG. 3 is a plan view of the personal computer 1 shown in FIG. 2; FIG. 4 is a left-hand side view of the personal computer 1 with the display unit 23 swung shut onto the body 22; FIG. 5 is a right-hand side view of the personal computer 1 with the display unit 23 swung open at 180 degrees relative to the body 22; FIG. 6 is a front view of the personal computer 1 shown in FIG. 4; and FIG. 7 is a bottom view of the personal computer 1 shown in FIG. 5.

The body 22 has on its top a keyboard 24 for entering various characters and symbols and a stick type pointing device 25 for moving a mouse cursor. The top of the body 22 also includes a speaker 28 for sound output and a shutter button 30 that is operated to cause a CCD video camera 43 in the display unit 23 to pick up images.

The upper edge of the display unit 23 has a pawl 33 that engages with a matching hole 26, provided in the position opposed to the pawl 33, in the body 22 when the display unit 23 is swung shut onto the body 22 as shown in FIG. 4. A slide lever 27 is provided at the front of the body 22 in such a manner that the slide lever 27 may be moved crosswise so as to let the pawl 33 lock into the hole 26 or disengage from its locked state. With the pawl 33 released from its locked condition, the display unit 23 may be swung open from the body 22. A microphone 44 is furnished next to the pawl 33. The microphone 44 is designed to pick up sound not only from the front of the device but also from the back, as depicted in FIG. 7.

A programmable power key (PPK) 29 is provided at the front of the body 22. The right-hand side of the body 22 has an exhaust port 31 as shown in FIG. 5, and the front bottom of the body 22 has a suction port 34 as indicated in FIG. 6. A slot 32 into which a PCMCIA (Personal Computer Memory Card International Association) card (PC card) may be inserted is further provided on the right side of the exhaust port 31.

The front of the display unit 23 has an LCD (liquid crystal display) 41 for displaying images. At the top of the LCD 41 is an image pickup unit 42 attached rotatably to the display unit 23. That is, the image pickup unit 42 may be rotated to any position at angles up to 180 degrees away from the same orientation as the LCD 41 and also to the opposite orientation (backwards). A CCD video camera 43 is attached to the image pickup unit 42.

Under the display unit 23 on the body side are a power lamp PL, a battery lamp BL, a message lamp ML, and other LEDs. Reference numeral 60 in FIG. 4 indicates a power switch furnished on the left-hand side of the body 22, and reference numeral 45 in FIG. 6 stands for a focusing ring used to adjust the focus of the CCD video camera 43. Reference numeral 46 in FIG. 7 designates a lid that covers an opening of the body 22 in which an add-on memory may be installed. Reference numeral 61 denotes a tiny hole into which to insert a pin to unlock the lid 46.

The GPS (Global Positioning System) 51 attached to the top of the display unit 23 is connected to a USB terminal 131. The GPS 51 functions as what is popularly called a navigation system which provides position information to the personal computer 1 operating in combination. The GPS 51 may be detached from the personal computer and carried around by itself. In its detached portable state, the GPS 51 records position and time information to an internal storage medium (not shown). When later connected to the USB terminal 131, the GPS 51 supplies the recorded position and time information to the personal computer 1.

Figure 8:
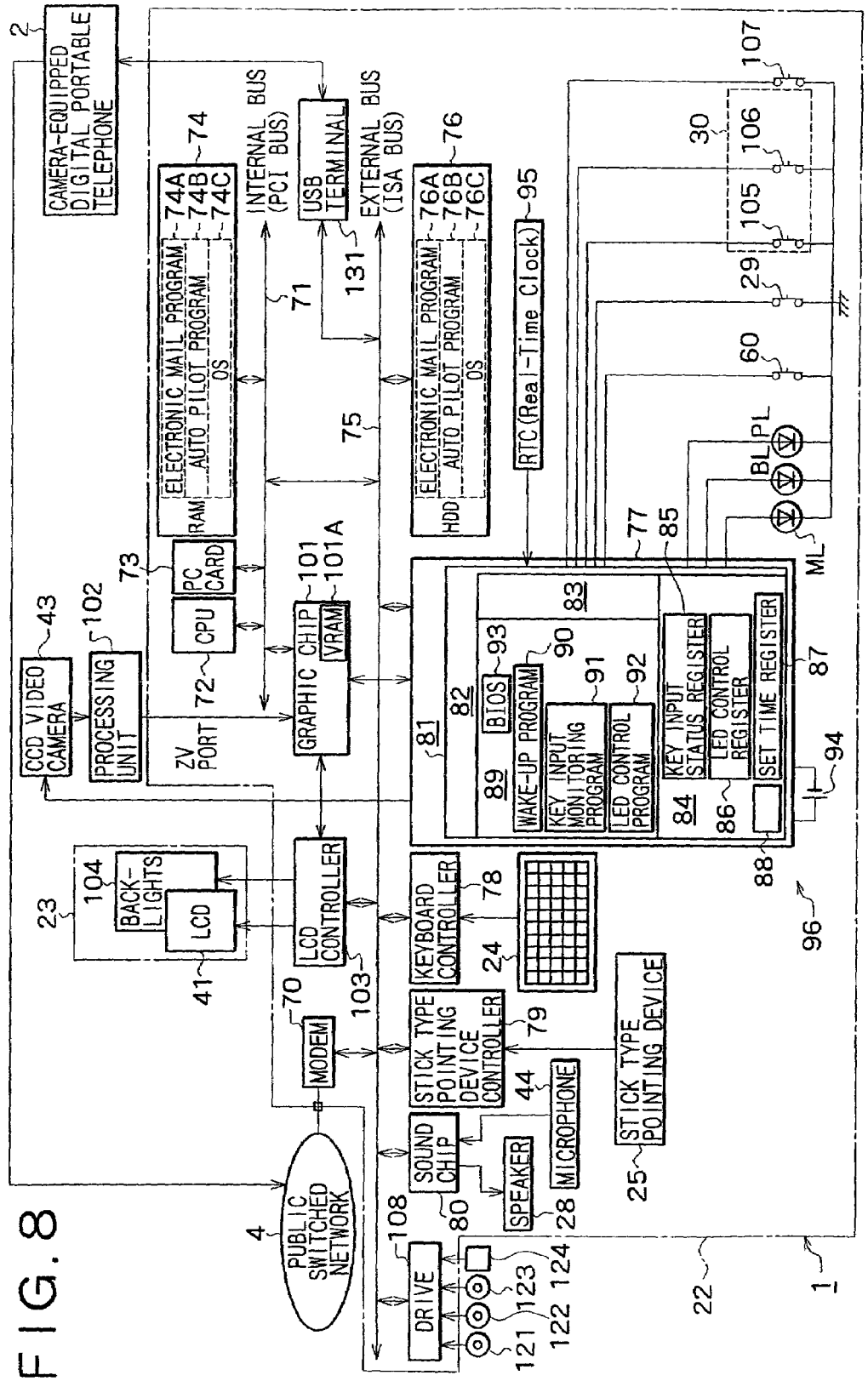
FIG. 8 is a block diagram of the personal computer in FIG. 1.

FIG. 8 is a block diagram showing an internal structure of the personal computer 1. As depicted in FIG. 8, an internal bus 71 is connected to a CPU (central processing unit) 72, a PC card 73 that may be inserted as needed, a RAM (random access memory) 74, and a graphic chip 101. The internal bus 71 hooks up to an external bus 75 connected to a hard disk drive (HDD) 76, an I/O (input/output) controller 77, a keyboard controller 78, a stick type pointing device controller 79, a sound chip 80, an LCD controller 103, and a modem 70.

The CPU 72 provides overall control functions. The PC card 73 is attached when an optional function needs to be added.

Upon boot-up, the HDD 76 transfers an electronic mail program (application program) 74A, an auto pilot program (application program) 74B, and an OS (operating system) 74C to the RAM 74. At the end of boot-up, the transferred programs are all retained in the RAM 74.

The electronic mail program 74A exchanges mails through communication lines such as telephone lines over the network. As its specific feature, the electronic mail program 74A offers a received mail acquisition function that queries the content server 8 to see if its mailbox has any received mail addressed to the program (i.e., user). If there is any such mail, the function causes the program to retrieve the mail.

The auto pilot program 74B starts up a plurality of predetermined processes (e.g., programs) in a predetermined sequence for processing.

The OS 74C is a software program that controls basic operations of the computer in which it is installed. One typical OS is Windows 98 (trademark).

The hard disk drive (HDD) 76 connected to the external bus 75 retains an electronic mail program 76A, an auto pilot program 76B, and an OS 76C. These programs are transferred successively to the RAM 74 during a boot-up process and stored in the memory after boot-up.

The I/O controller 77 has a microcontroller 81 furnished with an I/O interface 82. The microcontroller 81 includes the I/O interface 82, a CPU 83, a RAM 84, and a ROM 89 interconnected therein. The RAM 84 has a key input status register 85, an LED (light emitting diode) control register 86, a set time register 87 and a register 88. The set time register 87 is used to start operation of a boot-up sequence control unit 96 at a user-predetermined time (which constitutes a boot-up condition). The register 88 stores a predetermined combination of operation keys (i.e., boot-up conditions) in association with an application program to be booted. When the user inputs the stored operation key combination, the stored application program (e.g., electronic mail program) is booted.

A one-touch operation of the programmable power key (PPK) 29 sets an operation key flag to the key input status register 85. The LED control register 86 controls illumination of the message lamp ML indicating the bootup status of the application program (electronic mail program) set in the register 88. A desired time may be set to the set time register 87.

The microcontroller 81 is connected to a battery 94 furnished for backup purposes. The battery 94 retains the settings in the registers 85, 86 and 87 when power to the body 22 is switched off.

The ROM 89 in the microcontroller 81 contains beforehand a wake-up program 90, a key input monitoring program 91, and an LED control program 92. The ROM 89 is constituted illustratively by an EEPROM (electrically erasable and programmable read only memory). The EEPROM is also called a flash memory. The microcontroller 81 is further connected to an RTC (real-time clock) 95 that continuously counts the current time.

The wake-up program 90 in the ROM 89 checks current time data from the RTC 95 to see if the time preset in the set time register 87 is reached. When the preset time is reached, the wake-up program 90 carries out a predetermined process (or program). The key input monitoring program 91 continuously checks to see if the PPK 29 is operated by the user. The LED control program 92 controls illumination of the message lamp ML.

The ROM 89 further has a BIOS (Basic Input Output System) 93 written therein. The BIOS 93 has functions for booting the OS 76C upon power-up and for allowing data to be exchanged between various application programs and peripheral devices (display unit, keyboard, hard disk drive, etc.) after power-up.

The keyboard controller 79 connected to the external bus 75 controls entries from the keyboard 24. The stick type pointing device controller 79 controls what is input by the stick type pointing device 25.

The sound chip 80 admits input from the microphone 44 and supplies sound signals to the built-in speaker 28.

The modem 70 may be connected to the Internet 9 or to the content server 8 through the public switched network 4 and access server 7.

The graphic chip 101 connected to the internal bus 71 admits image data that are captured by the CCD video camera 43 and then processed by a processing unit 102 before being fed to the graphic chip 101 through a ZV (zoomed video) port. Given the video data from the CCD video camera 43 through the processing unit 102, the graphic chip 101 stores the received video data into an internal VRAM 101A and retrieves the stored video data as needed for output to the LCD controller 103. The LCD controller 103 forwards the image data coming from the graphic chip 101 on to the LCD 41 for display. Backlights 104 illuminate the LCD 41.

Operating the power switch 60 causes power to be applied and removed. A half-push switch 105 is turned on when the shutter button 30 is half-pushed; a full-push switch 106 is switched on when the shutter button 30 is fully pushed. A reverse switch 107 is activated when the image pickup unit 42 is rotated 180 degrees from its initial position (i.e., when the CCD video camera 43 is oriented so as to take pictures of an object at the back of the LCD 41).

A drive 108 is connected to the external bus 75. The drive 108 may accommodate a magnetic disk 121 (including the floppy disk), an optical disk 122 (including CD-ROM (compact disk-read only memory) and DVD (digital versatile disk)), a magneto-optical disk 123 (including MD (Mini-Disc)), or a semiconductor memory 124. Programs and/or data stored on the loaded storage medium are retrieved therefrom and supplied to the HDD 76 or RAM 74 through the external bus 75 or internal bus 71.

When supplied with programs and/or data from the modem 70, HDD 76 or RAM 74 over the external bus 75 or internal bus 71, the drive 108 writes the supplied programs and/or data to the loaded magnetic disk 121, optical disk 122, magneto-optical disk 123, or semiconductor memory 124.

Figure 9:
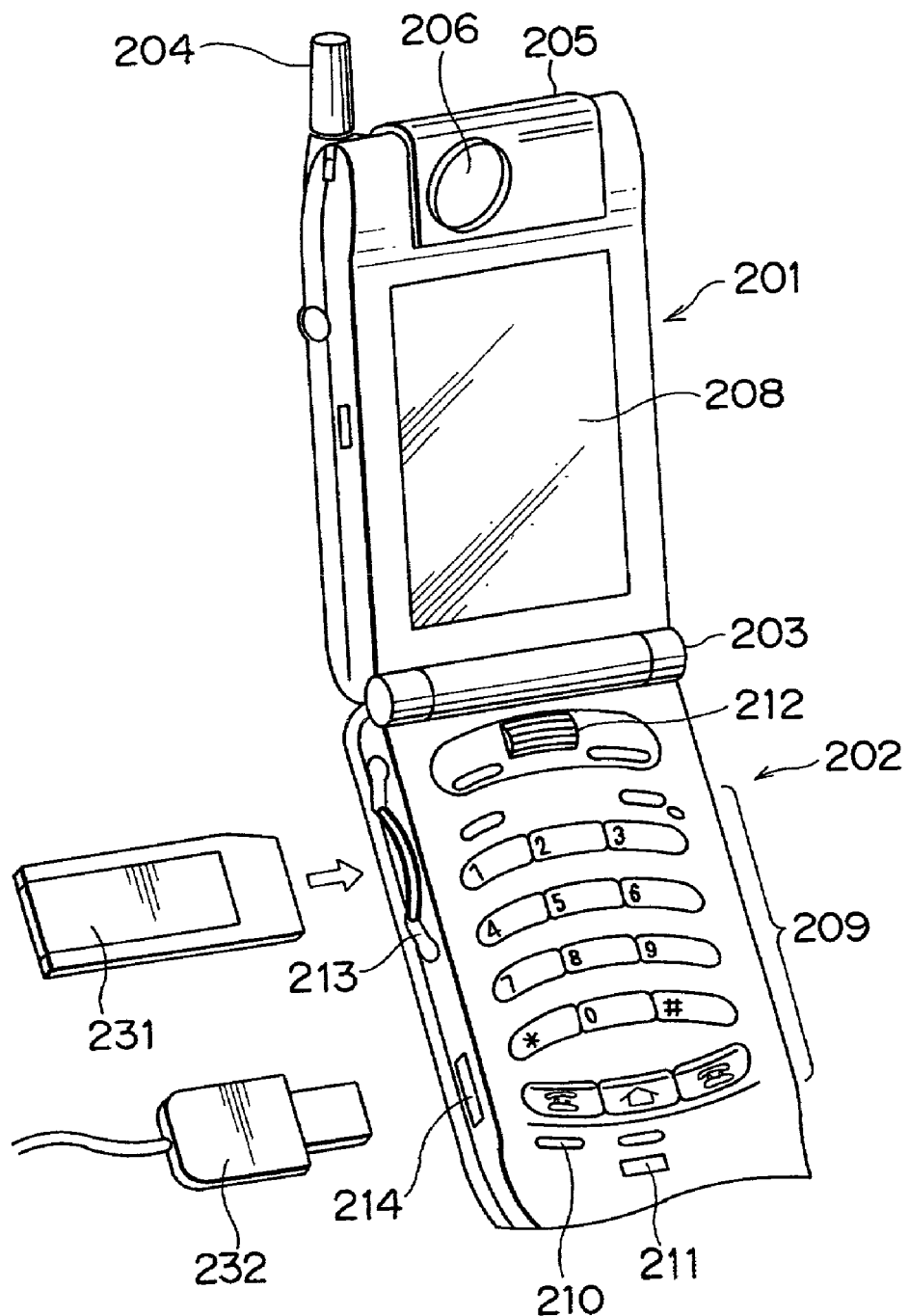
FIG. 9 is an external view of a camera-equipped digital portable telephone shown in FIG. 1.

An external constitution of the camera-equipped digital portable telephone 2 will now be described with reference to FIG. 9. As shown in FIG. 9, the camera-equipped digital portable telephone 2 is made up of a display unit 201 and a body 202. The display unit 201 folds onto the body 202 around a hinge portion 203 in the middle of the device.

The display unit 201 has a retractable transceiver antenna 204 furnished at its top left position. Using the antenna 204, the camera-equipped digital portable telephone 2 sends and receives radio waves to and from the base station 3 that is a stationary wireless station.

The display unit 201 has a camera unit 205 mounted on its top edge at the center. From its initial position, the camera unit 205 may be rotated over a range of about 180 degrees. The user of the camera-equipped digital portable telephone 2 takes pictures of a desired object by means of a CCD camera 206 in the camera unit 205.

Figure 10:
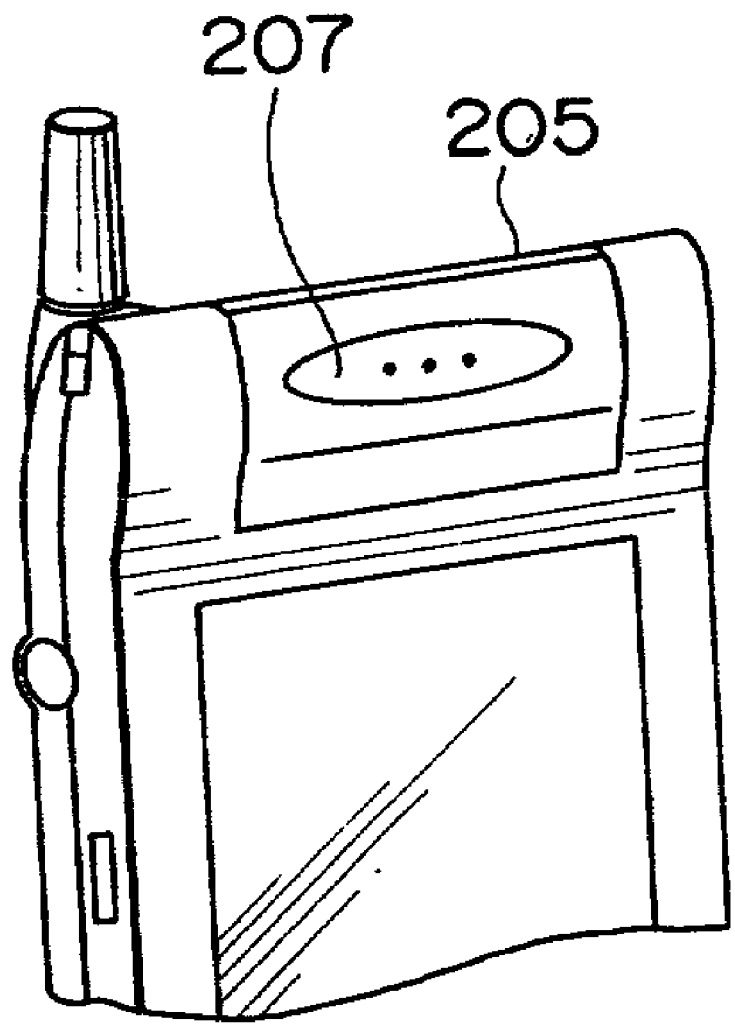
FIG. 10 is another external view of the camera-equipped digital portable telephone in FIG. 1.

When the user rotates the camera unit 205 by 180 degrees from its initial position, the display unit 201 is positioned in such a manner that the speaker 207 in the rear middle of the camera unit 205 faces the front as shown in FIG. 10. When set in that state, the camera-equipped digital portable telephone 2 operates in regular voice call mode.

A liquid crystal display 208 is furnished at the front of the display unit 201. The liquid crystal display 208 displays such indications as radio wave reception status, the remaining battery level, names of parties to be called and their telephone numbers in telephone directories, and call histories, as well as e-mail contents, simple-format website contents, and images picked up by the CCD camera 206 of the camera unit 205.

The body 202 has numeric keys "0" through "9" and operations keys 209 including an off-hook key, a redial key, an on-hook/power key, a clear key, and an e-mail key. Various commands reflecting manipulations of the operation keys 209 are input to the camera-equipped digital portable telephone 2.

Under the operation keys 209 on the body 202 are a memo button 210 and a microphone 211. Operating the memo button 210 during a phone call causes the portable telephone 2 to record the other party's voice. The microphone 211 picks up the voice of the user holding the camera-equipped digital portable telephone 2 during a phone call.

Further, a rotatable jog dial 212 is provided above the operation keys 209 on the body 202, the dial top slightly projecting from the body surface. Rotating the jog dial 212 allows the user of the camera-equipped digital portable telephone 2 to scroll a telephone directory list or an e-mail, change pages of simple-format website contents, or move images forward and backward on the screen of the liquid crystal display 208.

Illustratively, the body 202 displays a plurality of telephone numbers for selection from a telephone directory list on the liquid crystal display 208 in response to rotating manipulations of the jog dial 212 by the user. When the user pushes the jog dial 212 down into the body 202, the currently selected number on the screen is finalized and a call is placed to that number automatically.

It is to be noted that the body 202 has a battery pack furnished on its back, not shown. When the on-hook/power key is switched on, the battery pack powers up the internal circuits and brings the telephone into an active state.

The top left-hand side of the body 202 has a Memory Stick slot 213 into which a detachable Memory Stick (the present applicant's trademark) 231 may be inserted. Pushing the memo button 210 during a phone call causes the camera-equipped digital portable telephone 2 to record the other party's voice to the loaded Memory Stick 231. The portable telephone 2 may record e-mail texts, simple-format website contents, or images picked up by the CCD camera 206 to the inserted Memory Stick in response to the user's operations.

The Memory Stick 231 is a flash memory card developed by Sony Corporation, applicant of the present invention. The Memory Stick is one variation of EEPROM, i.e., an electrically writable and erasable nonvolatile memory constituted by flash memory elements housed in a small, thin plastic case measuring 21.5 mm by 50 mm by 2.8 mm. Through a 10-pin terminal, the memory device allows diverse data such as image, voice and music data to be written thereto and read therefrom.

The Memory Stick 231 adopts a proprietary serial protocol that ensures compatibility with different devices subject to specification changes caused illustratively by capacity enhancements in their built-in flash memories. With its protocol, the memory provides write speeds of up to 1.5 MB/S and read speeds of up to 2.45 MB/S. A write protect switch furnished to the Memory Stick 231 affords a high degree of data security.

Therefore, the camera-equipped digital portable telephone 2, designed to accommodate the above-described Memory Stick 231, can share data with other electronic devices using the Memory Stick 231 as an intermediary.

The bottom left-hand side of the body 202 is furnished with a USB (Universal Serial Bus) terminal 214. A USB connector 232 coupled to the USB terminal 214 provides a hookup to the personal computer 1 or PDA 5 for data exchanges.

Figure 11:
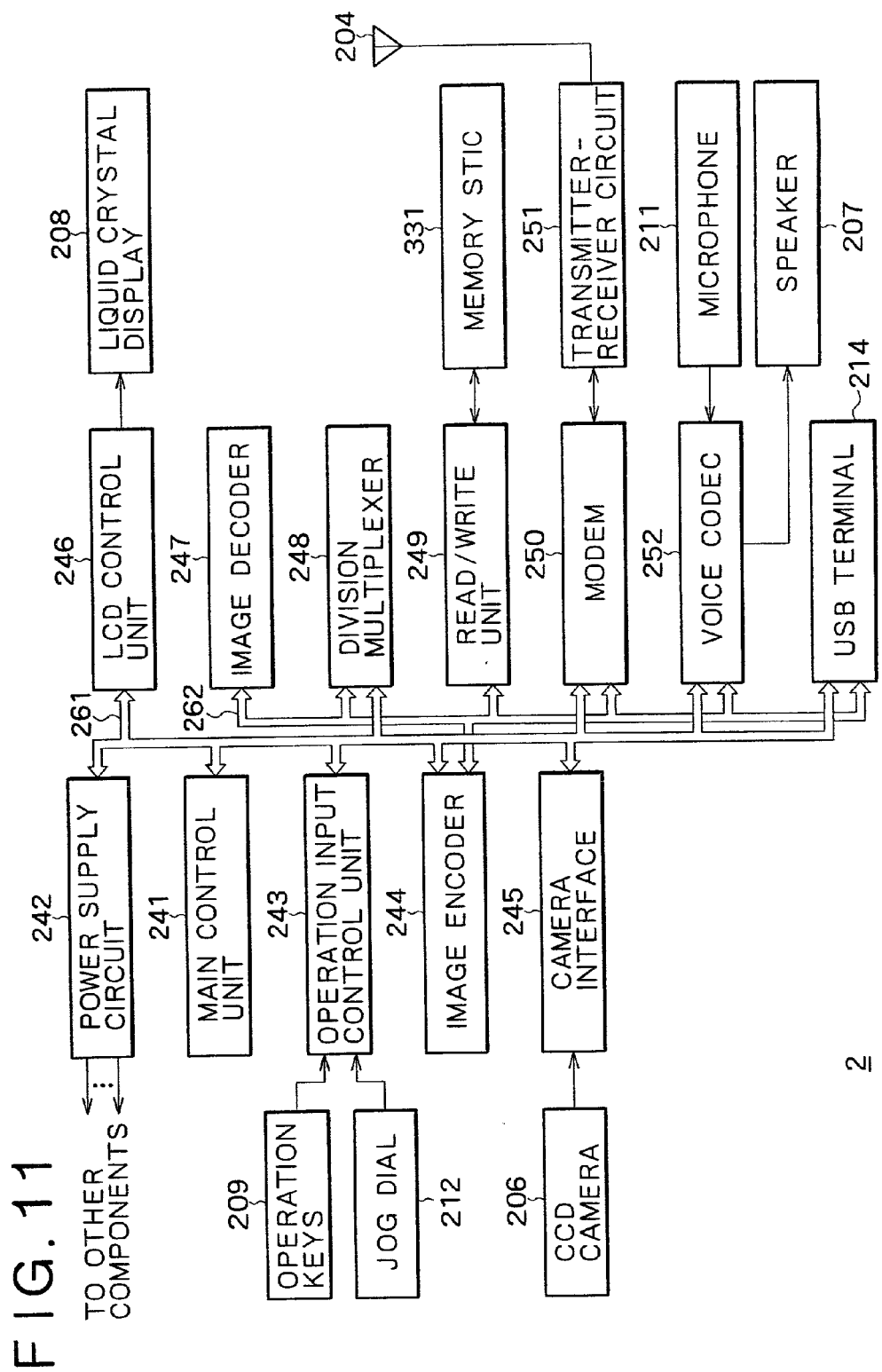
FIG. 11 is a block diagram of the camera-equipped digital portable telephone in FIG. 1.

As shown in FIG. 11, the camera-equipped digital portable telephone 2 has a main control unit 241 that provides overall control on the components of the display unit 201 and body 202. The main control unit 241 is connected via a main bus 261 to a power supply circuit 242, an operation input control unit 243, an image encoder 244, a camera interface 245, an LCD (liquid crystal display) control unit 246, an image decoder 247, a division multiplexer 248, a read/write unit 249, a modem 250, a voice codec 252, and the USB terminal 214. The image encoder 244, image decoder 247, division multiplexer 248, modem 250, voice codec 252, and USB terminal 214 are interconnected through a synchronous bus 262.

When the user turns on the on-hook/power key, the power supply circuit 242 causes the battery pack to power the components and thereby brings the camera-equipped digital portable telephone 2 into an operable state.

Under control of the main control unit 241 including a CPU, a ROM and a RAM, the camera-equipped digital portable telephone 2 causes the voice codec 252 to convert voice signals picked up by the microphone 211 in voice call mode into digital voice data. The portable telephone 2 then subjects the digital voice data to spread-spectrum encoding by the modem 250. A transmitter-receiver circuit 251 subjects the encoded data to a digital-analog conversion process and a frequency conversion process before transmitting the converted data via the antenna 204.

Further, in voice call mode, the camera-equipped digital portable telephone 2 amplifies signals received via the antenna 204 and subjects the received signals to frequency conversion and analog-digital conversion. The converted signals are subjected to spread-spectrum decoding by the modem 250 before being converted to analog voice signals by the voice codec 252. The camera-equipped digital portable telephone 2 causes the speaker 207 to effect a voice output representative of the analog voice signals.

Furthermore, in data communication mode, the camera-equipped digital portable telephone 2 transmits electronic mail as follows: the user enters e-mail text data by manipulating the operation keys 209 and jog dial 212. The input text data are forwarded to the main control unit 241 through the operation input control unit 243.

The main control unit 241 puts the text data to spread-spectrum encoding by the modem 250 and subjects the encoded data to digital-analog conversion and frequency conversion by the transmitter-receiver circuit 251. The data thus converted are transmitted to the base station 3 via the antenna 204.

Also in data communication mode, the camera-equipped digital portable telephone 2 receives electronic mail as follows: signals received from the base station 3 via the antenna 204 are subjected to spread-spectrum decoding by the modem 250 whereby the original text data are restored. The text is then displayed as an e-mail content on the liquid crystal display 208 under control of the LCD control unit 246.

The LCD control unit 246 is connected to the liquid crystal display 208 through a flexible printed circuit board having a panel ID setting unit.

With e-mail received and displayed, the camera-equipped digital portable telephone 2 may record the received mail to the Memory Stick 231 through the read/write unit 249 in response to the user's operations.

When transmitting image data picked up by the CCD camera 206 in data communication mode, the camera-equipped digital portable telephone 2 feeds the data to the image encoder 244 through the camera interface 245.

It is to be noted that when not transmitting image data captured by the CCD camera 206, the camera-equipped digital portable telephone 2 may cause the data to be displayed directly on the liquid crystal display 208 via the camera interface 245 and LCD control unit 246.

Given image data from the CCD camera 206, the image encoder 244 subjects the data to compression coding based on MPEG (Moving Picture Experts Group) 2, MPEG4 or other suitable coding standards. The coded image data thus obtained are sent to the division multiplexer 248.

At the same time, the camera-equipped digital portable telephone 2 feeds the division multiplexer 248 with digital voice data representative of the voice captured by the microphone 211 during image pickup by the CCD camera 206. The captured voice is coded beforehand into the digital voice data by the voice codec 252.

The division multiplexer 248 multiplexes the coded image data from the image encoder 244 and the voice data from the voice codec 252 by a predetermined method, subjects the data thus multiplexed to spread-spectrum encoding by the modem 250, submits the encoded data to digital-analog conversion and frequency conversion by the transmitter-receiver circuit 251, and transmits the data thus converted from the antenna 204.

When admitting moving image file data from, for example, a linked simple-format website in data communication mode, the camera-equipped digital portable telephone 2 first receives signals from the base station 3 via the antenna 204. The received signals are subjected to spread-spectrum decoding by the modem 250. The multiplexed data derived from decoding are forwarded to the division multiplexer 248.

The division multiplexer 248 divides the received multiplexed data into coded image data and voice data. The coded image data are fed to the image decoder 247 and the voice data to the voice codec 252 through the synchronous bus 262.

The image decoder 247 decodes the coded image data received to generate playback-ready moving image data using a decoding method compatible with the coding standard in effect such as MPEG2 or MPEG4. The moving image data thus decoded are supplied to the liquid crystal display 208 through the LCD control unit 246. These steps allow the camera-equipped digital portable telephone 2 to display image data derived illustratively from a moving image file from a linked simple-format website.

In the process above, the voice codec 252 converts the voice data involved into analog voice signals that are supplied to the speaker 207 for audio output. This allows the camera-equipped digital portable telephone 2 to play back the voice data contained illustratively in the moving image file from the linked simple-format website.

As in the case of electronic mail, the user may operate the camera-equipped digital portable telephone 2 to write to the Memory Stick 231 the received data from linked simple-format websites or the like by way of the read/write unit 249.

Figure 12:
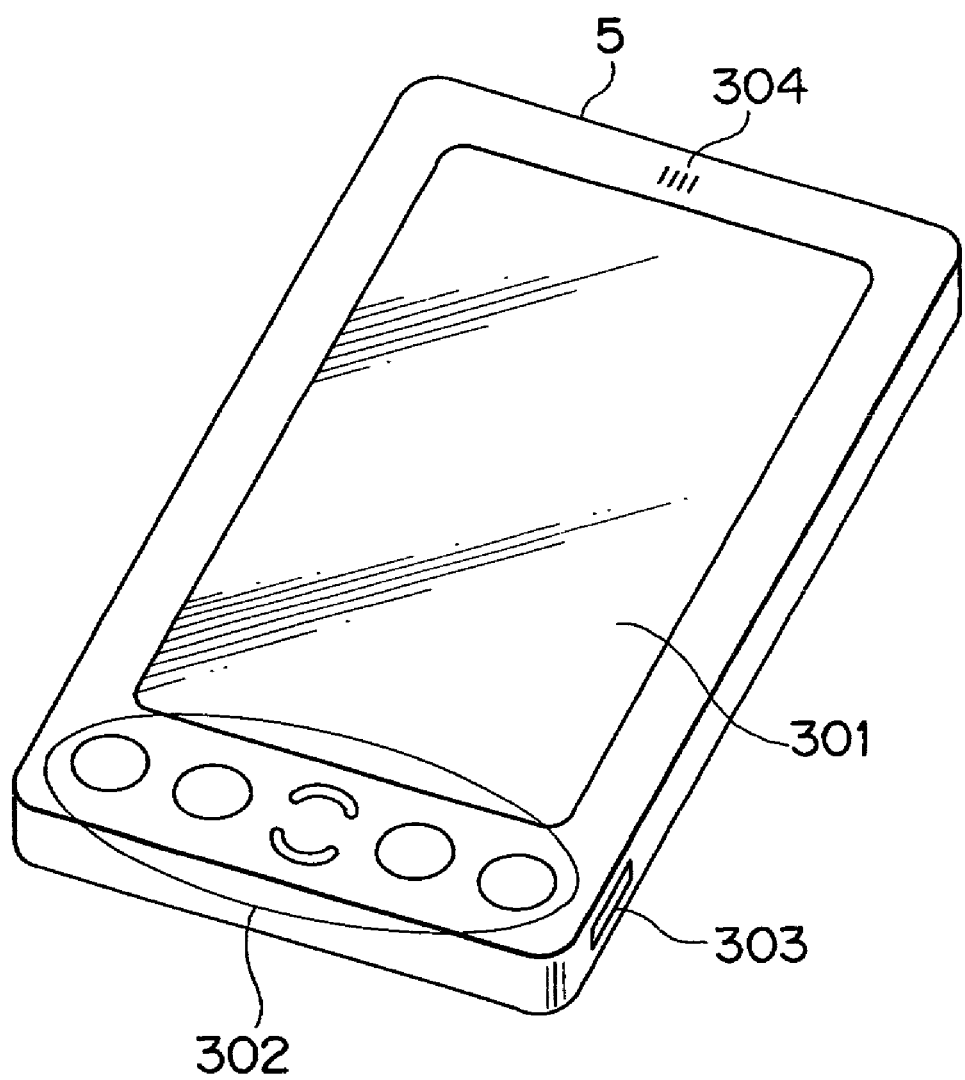
FIG. 12 is an external view of a PDA shown in FIG. 1.

The PDA 5 will now be described by referring to FIG. 12. The PDA 5 includes a display unit 301, an input unit 302, a USB terminal 303, and a voice playback unit 304.

The display unit 301 is constituted by a thin display device such as a liquid crystal display, and displays images including icons and text. The voice playback unit 304, made up of a speaker and a voice data decoding circuit, decodes voice data stored previously in the PDA 5 or received over a communication line for voice reproduction.

The input unit 302 includes input keys that are operated to select icons displayed on the display unit 301 and make other entries. The input unit 302 may be implemented alternatively as a touch panel furnished on the upper side of the display unit 301.

The USB terminal 303 is connected through a USB connector to the personal computer 1, camera-equipped digital portable telephone 2 or the like. Various data are exchanged through the USB terminal 303 between the PDA 5 and the attached device.

FIG. 13 is a block diagram illustrating the typical structure of the PDA 5. A CPU 311 carries out programs such as a display program held in a ROM 312 or a RAM 313. The ROM 312 is constituted by an EEPROM or by a flash memory. In general, the ROM 312 accommodates programs and basically fixed data in arithmetic parameters for use by the CPU 311. The RAM 313 is constituted illustratively by an SRAM (static RAM) and accommodates programs used by the CPU 311 in execution as well as parameters that may vary during such execution.

The display unit 301, constituted illustratively by a liquid crystal display, allows diverse kinds of information to be displayed in text and images. The voice playback unit 304 may receive voice data from the USB terminal 303 or a communication unit 318 via an interface 315, or voice data read from the RAM 313. The data thus received or retrieved are output for audio playback. The input unit 302 comprises input keys that the user operates when issuing entering various commands to the CPU 311.

The interface 315 is connected to an external drive 316. The drive 316 accommodates a magnetic disk 321, an optical disk 322 (including CD-ROM), a magneto-optical disk 323, or a semiconductor memory 324; retrieves data or programs from the storage medium thus loaded; and sends the retrieved data or programs to the ROM 312 or RAM 313 through the interface 315 and a bus 314.

The GPS 317 receives signals from satellites, not shown, to find out the current location in latitude and longitude. The communication unit 318 receives data (such as a content transmission request) from the CPU 311 or voice data representative of the user's voice from the input unit 302, puts the received data into packets according to a predetermined method, and transmits the packets to a desired destination over the public switched network 4 or the like connected to the unit 318. Furthermore, the communication unit 318 retrieves data (e.g., voice data, image data contents) or programs from packets sent by another party over the public switched network 4, and outputs the received data or programs to the CPU 311, RAM 313, to the voice playback unit 304, or to the interface 315. The same process performed by the communication unit 318 may also be carried when the PDA 5 is connected via the USB terminal 303 and camera-equipped digital portable telephone 2 to the public switched network 4.

The components ranging from the CPU 311 to the communication unit 318 are interconnected by the bus 314.

Figure 14:
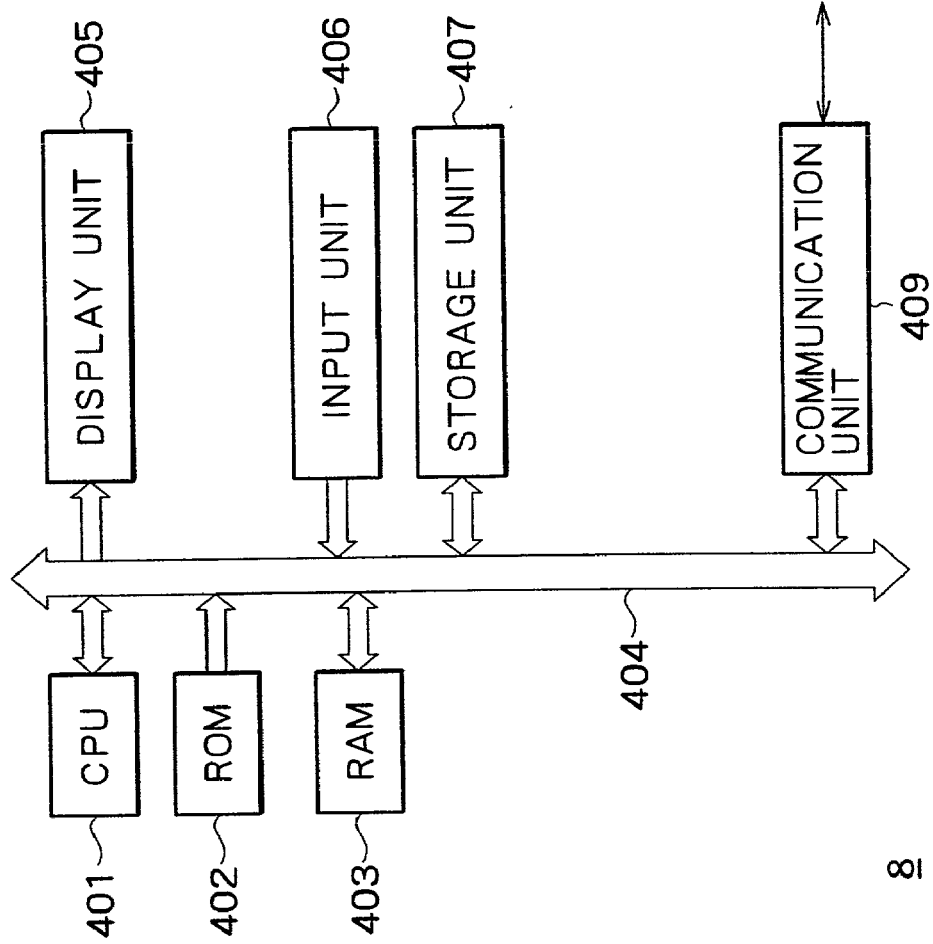
FIG. 14 is a block diagram of a content server shown in FIG. 1.

A typical structure of the content server 8 will now be described with reference to FIG. 14.

A CPU 401 controls operation of the content server 8 as a whole. More specifically, the CPU 401 reads diverse programs from a ROM 402 or a storage unit 407 as needed and puts them to a RAM 403 for execution. A display unit 405 displays results of executed programs or information entered by the user through an input unit 406.

A communication unit 409 includes a modem and a terminal adapter. As such, the communication unit 409 exchanges data with the personal computer 1, PDA5, and WWW server 10a through 10z via the access server 7 and the Internet 9.

The components ranging from the CPU 401 to the communication unit 409 are interconnected by a bus 404.

Figure 15:
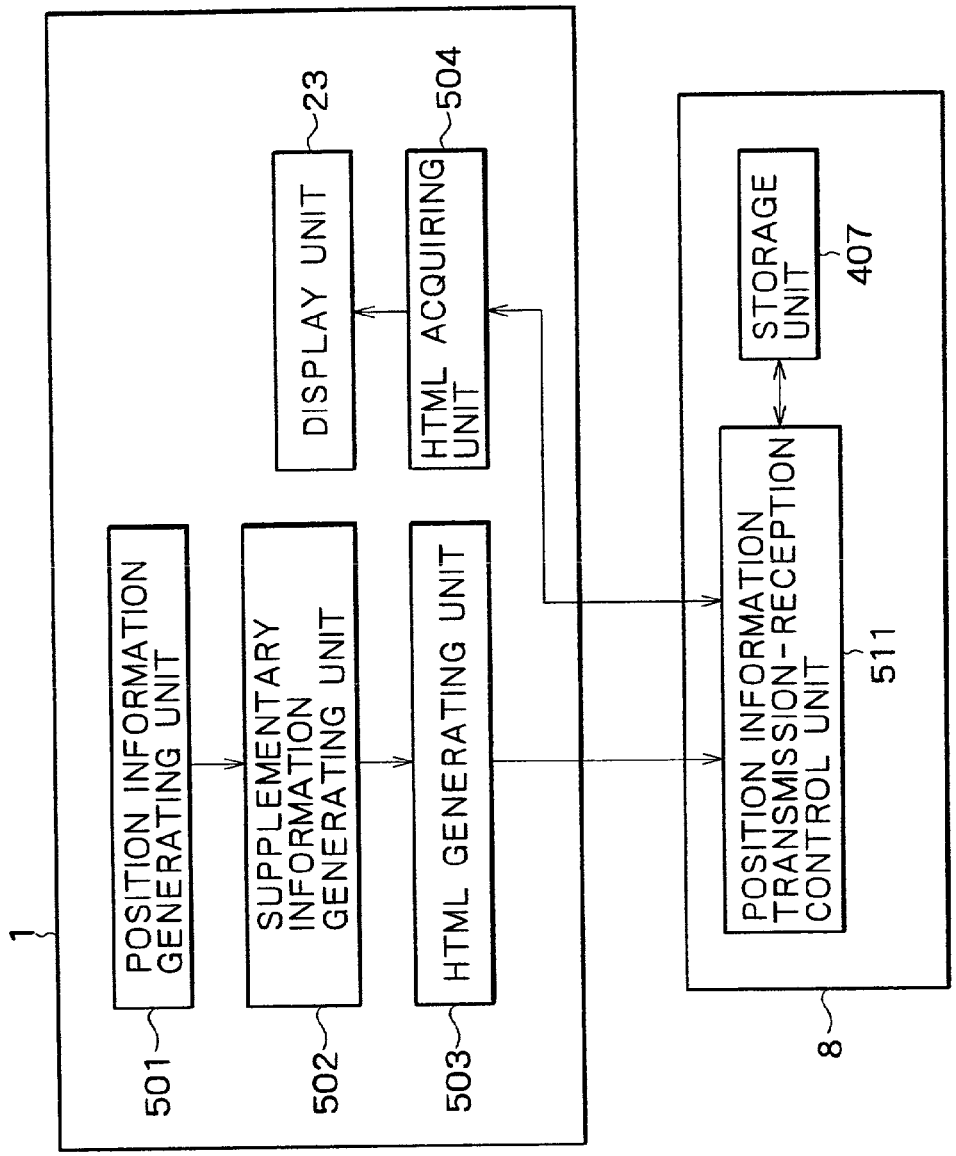
FIG. 15 is a control block diagram of the personal computer and content server in FIG. 1.

FIG. 15 is a control block diagram of the personal computer 1 and content server 8.

A position information generating unit 501 generates information on the position (in latitude and longitude) of the personal computer 1 (i.e., position of the user operating the personal computer 1) on the basis of position information entered at predetermined intervals from the GPS 51. The position information thus generated is output to a supplementary information generating unit 502.

The supplementary information generating unit 502 supplements the position information from the position information generating unit 501 with previously furnished map data retrieved from an HDD 76 as supplementary information. The position information thus supplemented is output to an HTML generating unit 503. More specifically, because the position information generated by the position information generating unit 501 consists of latitude and longitude values only, the information is expanded by collation with the map data retained in advance on the HDD 76. The collating process supplements the information with map images, place names, street names and other data about the neighborhood. The newly prepared map data are output to the HTML generating unit 503.

The supplementary data may include not only geographical map data but also contour map data, temperature distribution map data, radiation dose map data, and/or air pollution map data. The user's position may be indicated on each of such supplementary map arrangements provided by the added data. The supplementary data are not limited to those previously held on the HDD 76; additional data may be downloaded through the modem 70, USB terminal 131 and camera-equipped digital portable telephone 2 from various WWW servers 10 located on the Internet 9.

The HTML generating unit 503 generates an HTML file indicative of the current position out of the supplemented position information about the personal computer 1, the information having been input from the supplementary information generating unit 502. The HTML file thus obtained is sent to the content server 8 through the camera-equipped digital portable telephone 2, base station 3, public switched network 4, and access server 7. It is to be noted that files generated by the HTML generating unit 503 may be in any format as long as they permit implementation of a website content indicative of the current position. For example, the HTML generating unit 503 may generate text data described either in HTML or in XML (Extensible Markup Language).

An HTML acquiring unit 504 acquires HTML files which are managed by the content server 8 and which contain information about other members' positions. The files come from the content server 8 via the access server 7, public switched network 4, base station 3, and camera-equipped digital portable telephone 2. The acquired files are converted to a format suitable for display on the display unit 23 of the personal computer 1 before being displayed on the unit 23.

A position information transmission-reception control unit 511 of the content server 8 receives HTML files from the personal computer 1, and stores the received files into predetermined user-wise directories furnished previously in the storage unit 407 which is applicable to individual users. When requested for position information by the personal computer 1, the position information transmission-reception control unit 511 transmits the requested HTML file to the PC 1.

How the personal computer 1 performs its position information transmitting process will now be described by referring to the flowchart of FIG. 16.

Figure 16:
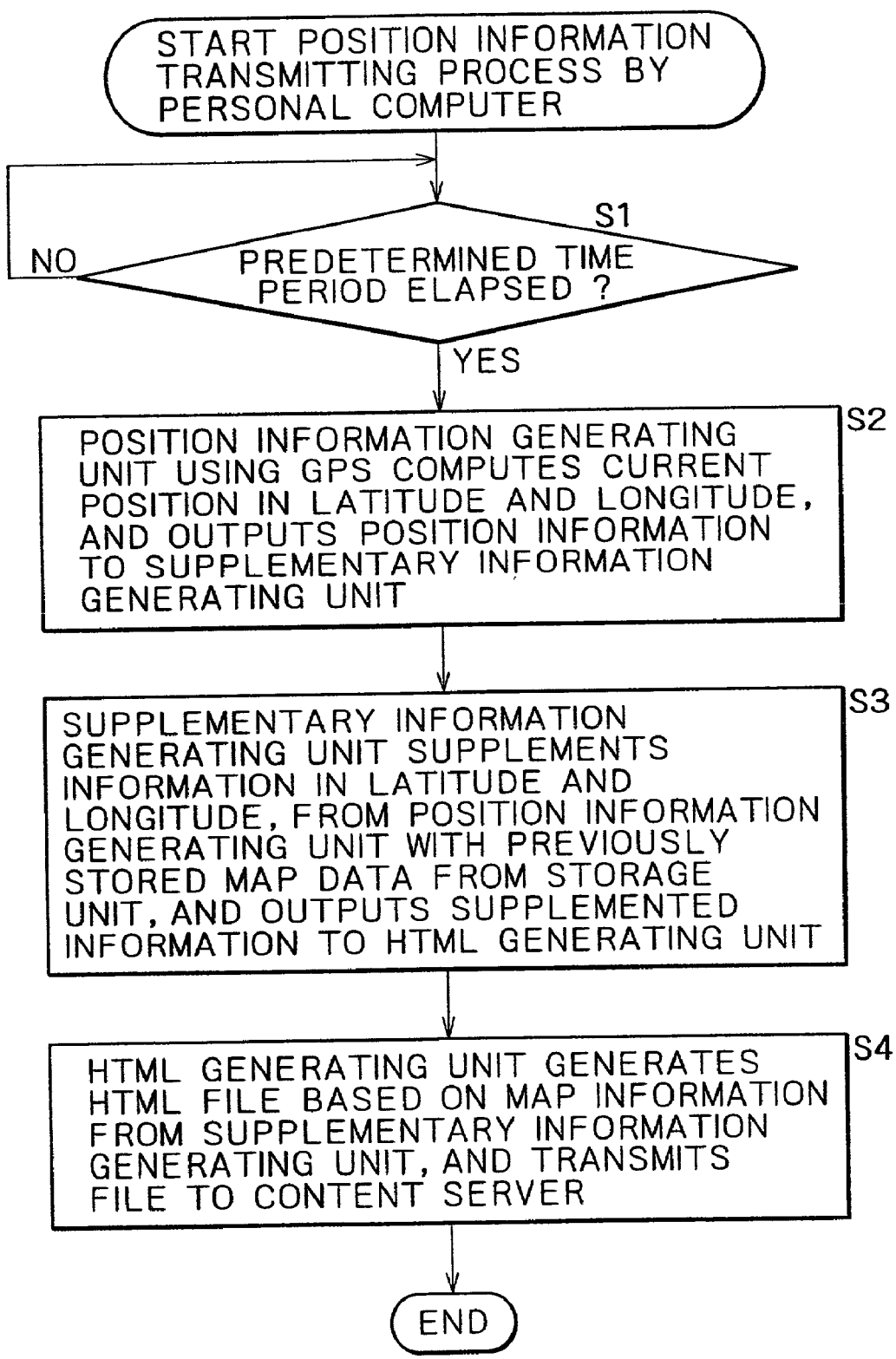
FIG. 16 is a flowchart of steps constituting a position information transmitting process performed by the personal computer in FIG. 1.

In step S1 of FIG. 16, the position information generating unit 501 checks to see if a predetermined period of time has elapsed. This step is repeated until the predetermined time period is judged to have passed. If in step S1 the predetermined period is judged to have elapsed, step S2 is reached.

In step S2, the position information generating unit 501 causes the GPS 51 to compute the current position in latitude and longitude. The position information thus computed is output to the supplementary information generating unit 502.

In step S3, the supplementary information generating unit 502 adds map data that were stored beforehand on the HDD 76 to the position information in latitude and longitude output from the position information generating unit 501. The information supplemented with the map data is output to the HTML generating unit 503.

In step S4, the HTML generating unit 503 generates an HTML file based on the map data-supplemented position information from the supplementary information generating unit 502. The HTML file thus generated is transmitted to the content server 8.

Figure 17:
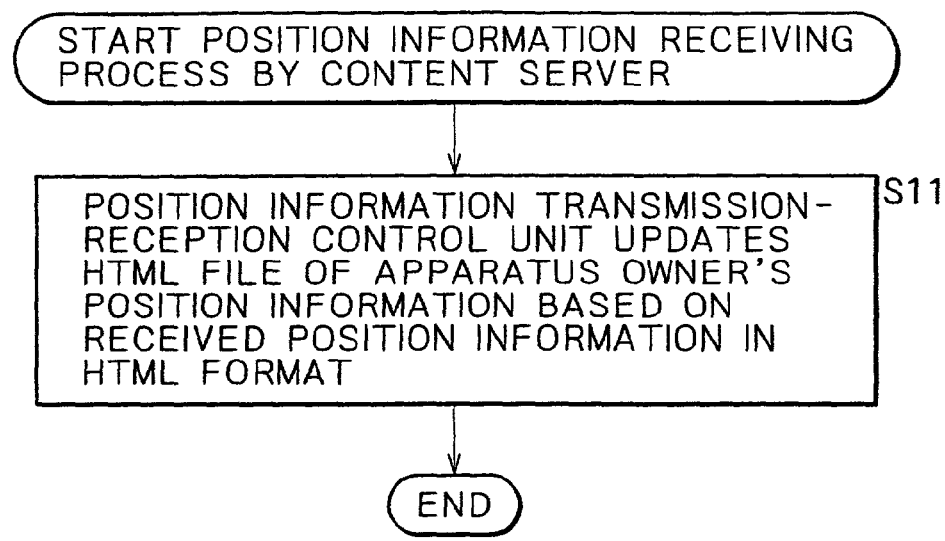
FIG. 17 is a flowchart of steps constituting a position information receiving process carried out by the content server in FIG. 1.

How the content server 8 carries out its position information receiving process will now be described by referring to the flowchart of FIG. 17. In step S11, the position information transmission-reception control unit 511 receives an HTML file sent from the personal computer 1 in the steps described with reference to the flowchart of FIG. 16. The transmission-reception control unit 511 ascertains who sent the information in question (i.e., which personal computer 1 transmitted the file), and stores the information into one of the previously furnished directories in the storage unit 407, the directory applying to the transmitting party.

How the personal computer 1 performs its position information acquiring process will now be described by referring to the flowchart of FIG. 18.

In step S21, the HTML acquiring unit 504 requests the content server 8 for position information about another member.

Figure 19:
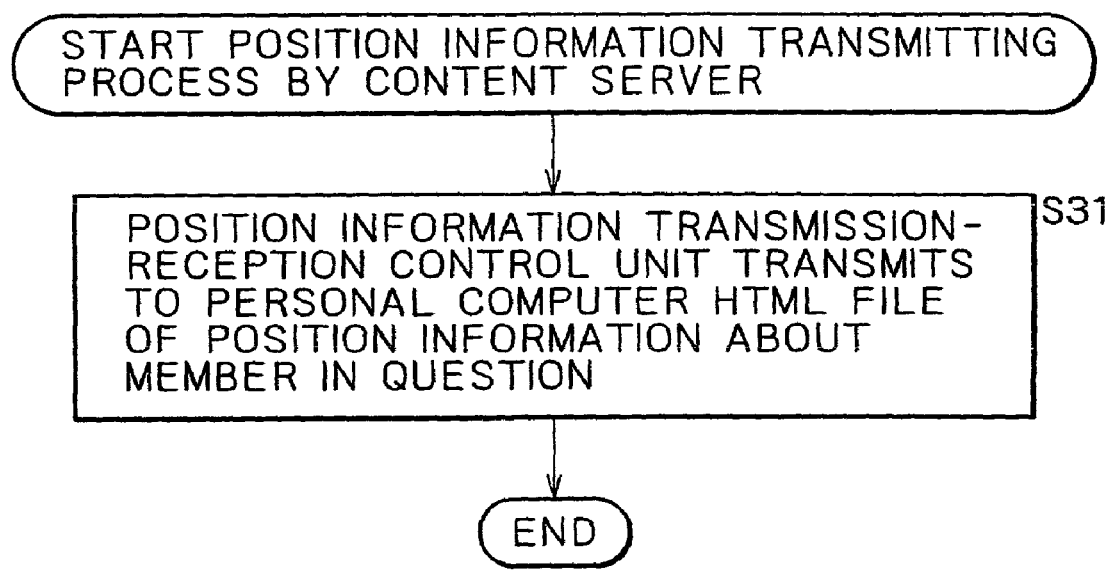
FIG. 19 is a flowchart of steps constituting a position information transmitting process conducted by the content server in FIG. 1.

Before the step next to step S21 is discussed, how the content server 8 carries out its position information transmitting process will now be described below with reference to the flowchart of FIG. 19. In step S31, the HTML file indicative of the position information about another member requested by the personal computer 1 in above-described step S21 is transmitted to the personal computer 1.

Figure 18:
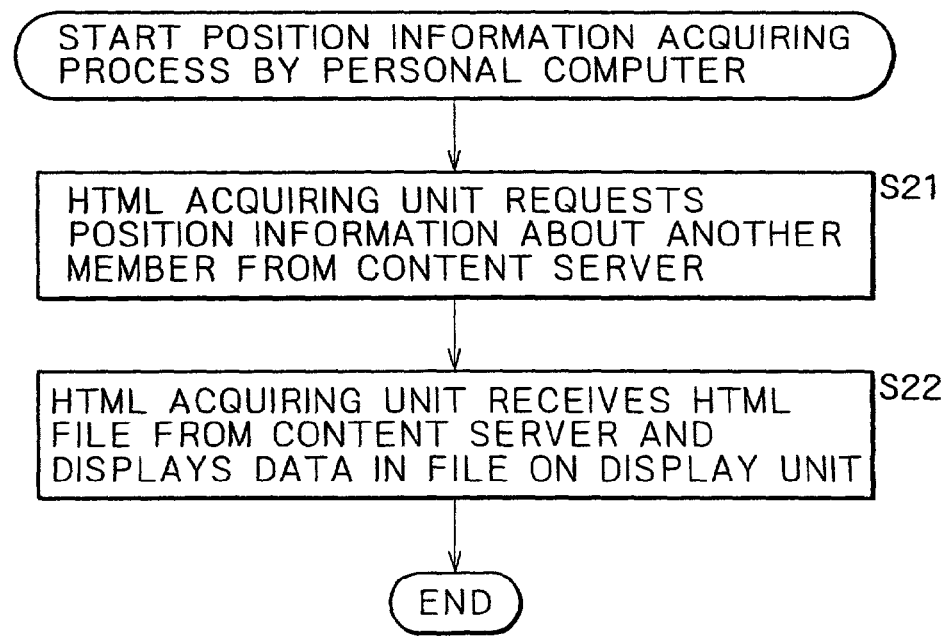
FIG. 18 is a flowchart of steps constituting a position information acquiring process executed by the personal computer in FIG. 1.

Now the description of the flowchart in FIG. 18 is resumed.

In step S22, the HTML acquiring unit 504 processes the HTML file sent from the content server 8. The content of the processed file is displayed on the display unit 23.

FIG. 20 is an example of a display screen appearing on the display unit 23 of the personal computer 1 showing an HTML file received from the content server 8.

A transmitting party name display field 601 shows the name of another member whose current position is being displayed. In this example, the field 601 indicates "SUZUKI ICHIRO." An update interval display field 602 shows intervals at which position information is updated by the convent server 8. In this example, the field 602 indicates "EVERY 5 MINUTES."

A route name display field 603 shows the route on which the other member is located at present. In this example, the field 603 indicates "DAITABASHI-YOYOGI," which means the member is now somewhere on the route starting in a locality called Daitabashi and ending in a place called Yoyogi.

Update time display fields 604a and 604b show the times at which the position information was last updated. In this example, the field 604a indicates "1. UPDATED AT 15:30, MAY 31, 2000," which means that the display that follows reflects the position information last updated at 15:30, May 31, 2000. The field 604b indicates "2. UPDATED AT 15:35, MAY 31, 2000," which signifies that the ensuing display reflects the position information updated most recently at 15:35, May 31, 2000.

In other words, the information appearing under the update time display field 604*a* is five minutes behind the information shown under the update time display field 604*b*. Whereas this example shows that position information has been updated only once, the information in practice is subsequently updated every five minutes so as to be supplemented with new data. Such a cumulative display of position information allows the user to understand the situation of the other member now in progress along the indicated route.

Current position information display fields 605*a* and 605*b* show the current position at each update time. The field 605*a* indicates "INOKASHIRA-DORI, OHARA, SETAGAYA-KU," which means that the current position is on the route called Inokashira-dori in the neighborhood known as Ohara, Setagaya-ku. The field 605*b* indicates "INOKASHIRA-DORI, NISHIHARA, SETAGAYA-KU," which signifies that the current position is on the Inokashira-dori route in the neighborhood of Nishihara, Setagaya-ku.

Map display fields 606*a* and 606*b* show neighborhood maps of the current position. Current position indicator marks 611*a* and 611*b* are provided to point to the current position. The marks 611 are each shaped like a wedge whose sharp point designates the direction in which the other member is advancing.

Although the embodiment discussed so far has been shown exchanging position information between the personal computer 1 and the content server 8, this is not limitative of the invention. For example, the position information acquiring process performed by the personal computer 1 may be taken over by the PDA 5 using similar steps. Such an alternative setup requires programming the PDA in a manner similar to what is shown in the block diagram of FIG. 15. If the personal computer 1 is arranged to send position information to specific members who share the information, the position information file in HTML format may alternatively be transmitted either by electronic mail or by use of FTP (File Transfer Protocol) to such specific members.

In the examples above, all position information exchanged between the personal computer 1 and the content server 8 was shown to be in HTML format. Alternatively, if the information is set in compact HTML format suitable for display on the camera-equipped digital portable telephone 2, the information may also be displayed on the display unit 201 of the camera-equipped digital portable telephone 2 and processed in the same manner as in the position information acquiring process by the personal computer 1. The portable telephone 2 may or may not be equipped with a camera, and the telephone 2 may be an analog type portable telephone.

The camera-equipped digital portable telephone 2 may be a PHS (Personal Handyphone System) phone unit. In such a case, a PHS position information system involving cells (repeaters) located at fairly short distances from the telephone in question allows its user to acquire position information relative to these cells. The position information thus obtained is stored as an HTML file or a compact HTML file into the content server 8. This makes it possible for the portable telephone to process the position information in a manner similar to the above-described processing performed by the personal computer 1.

In the description above, the personal computer 1 or PDA 5 was shown transmitting position information via the camera-equipped digital portable telephone 2. Alternatively, the personal computer 1 and PDA 5 may each be furnished with mobile communication functions such as those of the portable telephone or PHS. The personal computer 1 or PDA 5 may use for data transmission not only the camera-equipped digital portable telephone 2 through the modem 70 and USB terminal 131, but also a terminal adapter, a LAN (local area network) board, or a PHS.

As described and according to the invention, position information on users' portable terminals such as personal computers 1 or PDAs 5 is managed in highly versatile HTML format files that may be referenced by each user using the portable termial. The scheme allows a plurality of users' diverse portable terminals to share position information therebetween.

The series of steps described above may be executed either by hardware or by software. For software-based processing to take place, programs constituting the software may be either incorporated beforehand in dedicated hardware or installed upon use from a suitable program storage medium into a general-purpose personal computer or like equipment capable of executing diverse functions.

As shown in FIG. 8, the program storage medium is offered to users not only in the form of the hard disk drive 76 which contains the programs and which is incorporated beforehand in the personal computer 1, but also as a package medium constituted by the magnetic disk 121 (including floppy disk), optical disk 122 (including CD-ROM (Compact Disk-read only memory) and DVD (digital versatile disk)), magneto-optical disk 123 (including MD (Minidisc)), or semiconductor memory 124.

In this specification, the steps which are stored on a program storage medium and which describe the programs to be executed represent not only processes that are carried out in the depicted sequence on a time series basis but also those that are conducted parallelly or individually.

In this specification, the term "system" refers to an entire configuration made up of a plurality of component devices.

While a preferred embodiment of the present invention has been described using specific terms, such description is for illustrative purposes only, and it is to be understood that changes and variations may be made without departing from the spirit or scope of the following claims.

What is claimed is:

1. An information processing system, comprising:
a first information processing apparatus, including:
position information acquiring unit configured to acquire position information of the first information processing apparatus;
position information converting unit configured to convert said position information acquired by said position information acquiring unit into converted data to be displayed on an at least one second information processing apparatus; said converted data being a position map in a predetermined format which permits implementation of a website content;
transmitting unit configured to transmit to a server said converted data at first time intervals and to transmit a message asking the server for data of the position of the at least one second specified information processing apparatus;
first receiving unit configured to receive said data of the position of the at least one second specified information processing apparatus from the server at second time intervals;
a display unit to display the data of the position of the at least one second specified information processing apparatus; and display updating unit configured to supplement the data of the position of the at least one second specified information processing apparatus displayed with new data at said second time intervals; and said server including:

second receiving unit configured to receive said converted data from said first information processing apparatus at said first time intervals and to receive said message from a user for data of the position of the at least one second specified information processing apparatus;

storing unit configured to store said received data into predetermined user-wise directories furnished previously in a storage area which is applicable to individual users;

transmitting unit configured to transmit a data stored in a specified directory in response to a request from the user who sends said message at said second time intervals of updating the data by said specified at least one second information processing apparatus.

2. A method of information processing in an information processing system, comprising the steps of:

acquiring position information of said information processing system by a first information processing apparatus;

converting said position information acquired in said position information acquiring step into converted data to be displayed on at least one second information processing apparatus; said converted data being a position map in a predetermined format which permits implementation of a website content;

transmitting from said first information processing apparatus to a server said converted data at first time intervals and transmitting a message asking the server for data of the position of the at least one second specified information processing apparatus;

receiving at said server, data including position information from a plurality of information processing apparatus at said first time intervals and receiving said message from a user for data of the position of the at least one second specified information processing apparatus;

storing said received data into predetermined user-wise directories furnished previously in a storage area which is applicable to individual users;

transmitting data stored in a specified directory of said storage area in response to a request from the user who sends said message at second time intervals of updating the data by said first specified information processing apparatus;

receiving at said first information processing apparatus, said data of the position of the at least one second specified information processing apparatus from the server at said second time intervals;

displaying the data of the position of the at least one second specified information processing apparatus; and supplementing the data of the position of the at least one second specified information processing apparatus displayed with new data at said second time intervals.

3. A first information processing apparatus comprising:

position information acquiring unit configured to acquire position information of the first information processing apparatus;

position information converting unit configured to convert said position information acquired by said position information acquiring unit into converted data to be displayed on an at least one second information processing apparatus; said converted data being a position map in a predetermined format which permits implementation of a website content;

transmitting unit configured to transmit to a server said converted data at first time intervals and to transmit a message asking the server for data of the position of the at least one second specified information processing apparatus;

receiving unit configured to receive said data of the position of the at least one second specified information processing apparatus from the server at second time intervals;

a display unit to display the data of the position of the at least one second specified information processing apparatus; and display updating unit configured to supplement the data of the position of the at least one second specified information processing apparatus displayed with new data at said second time intervals.

4. A method of information processing using a first information processing apparatus, comprising the steps of:

acquiring position information of said first information processing apparatus by said processing apparatus;

converting said position information acquired in said position information acquiring step into converted data to be displayed on an at least one second information processing apparatus; said converted data being a position map in a predetermined format which permits implementation of a website content;

transmitting to a server said converted data at first time intervals and transmitting a message asking the server for data of the position of the at least one second specified information processing apparatus;

receiving said data of the position of the at least one second specified information processing apparatus from the server at second time intervals;

displaying the data of the position of the at least one second specified information processing apparatus; and supplementing the data of the position of the at least one second specified information processing apparatus displayed with new data at said second time intervals.

* * * * *